(12) United States Patent
Li et al.

(10) Patent No.: US 10,205,257 B1
(45) Date of Patent: Feb. 12, 2019

(54) ENERGY SAVING USB RECEPTACLE

(71) Applicant: Raffel Systems, LLC, Germantown, WI (US)

(72) Inventors: Paul Li, Milwaukee, WI (US); Douglas A. Dorn, Brookfield, WI (US); Jason D. Rohloff, Franklin, WI (US); Justin R. Saul, Milwaukee, WI (US)

(73) Assignee: Raffel Systems, LLC, Germantown, WI (US)

( * ) Notice: Subject to any disclaimer, the term of this patent is extended or adjusted under 35 U.S.C. 154(b) by 0 days.

(21) Appl. No.: 15/824,640

(22) Filed: Nov. 28, 2017

(51) Int. Cl.
G06F 1/32 (2006.01)
H01R 12/70 (2011.01)
H01R 13/6593 (2011.01)

(52) U.S. Cl.
CPC ....... H01R 12/7088 (2013.01); G06F 1/3215 (2013.01); H01R 13/6593 (2013.01)

(58) Field of Classification Search
CPC ............ H01R 13/6593; H01R 13/7032; H01R 13/658; H01R 13/6581; H01R 13/6592; H01R 2103/00; H01R 13/703; H01R 13/7031; H01R 12/7088; G06F 1/3215
USPC .................................. 439/188, 607.35–607.4
See application file for complete search history.

(56) References Cited

U.S. PATENT DOCUMENTS

| | | | |
|---|---|---|---|
| 5,312,273 A * | 5/1994 | Andre | ................ H01R 13/6582 439/607.26 |
| 6,062,883 A | 5/2000 | Schreiber et al. | |
| 6,671,814 B1 | 12/2003 | Kubo et al. | |
| 6,896,541 B2 * | 5/2005 | Benson | ................ H01R 13/641 439/188 |
| 8,853,884 B2 | 10/2014 | Genannt Berghegger et al. | |
| 9,563,244 B2 | 2/2017 | Stevens | |
| 2004/0026998 A1 | 2/2004 | Henroitt et al. | |
| 2008/0012423 A1 | 1/2008 | Mimran | |
| 2010/0201208 A1 | 8/2010 | Berghegger et al. | |
| 2010/0311283 A1 | 12/2010 | Desroisers et al. | |
| 2012/0153747 A1 | 6/2012 | Lu et al. | |
| 2013/0295782 A1 | 11/2013 | Goel et al. | |
| 2014/0320073 A1 | 10/2014 | Schwartz et al. | |
| 2017/0141593 A1 | 5/2017 | Chen et al. | |
| 2017/0298892 A1 * | 10/2017 | Koenen | ................... B60T 7/042 |

FOREIGN PATENT DOCUMENTS

CN 102025169 3/2013
WO WO 2008/065659 6/2008

* cited by examiner

*Primary Examiner* — Gary F Paumen
(74) *Attorney, Agent, or Firm* — Casimir Jones S.C.; Tyler Sisk

(57) ABSTRACT

Provided herein is technology relating to providing power over a universal serial bus (USB) connection and particularly, but not exclusively, to devices, methods, and systems related to a (USB) technology for reducing energy consumption by a USB receptacle.

7 Claims, 12 Drawing Sheets

US 10,205,257 B1

ENERGY SAVING USB RECEPTACLE

STATEMENT REGARDING FEDERALLY
SPONSORED RESEARCH OR DEVELOPMENT

Field

Provided herein is technology related to providing power over a universal serial bus (USB) connection and particularly, but not exclusively, to devices, methods, and systems related to a (USB) technology for reducing energy consumption by a USB receptacle.

BACKGROUND

Universal Serial Bus ("USB") technology is designed to provide electrical power from hosts to devices connected to the hosts by a USB cable. In particular, a host USB receptacle draws electrical power from the host power supply and provides electrical power to a USB plug mated with ("plugged into") the receptacle with power carried from one plug at the host end of a USB cable to another plug at the device end of the USB cable mated with a device receptacle. Some hosts, e.g., many types of consumer electronics devices and furniture (e.g., tables, lamps, alarm clocks, etc.), are designed to provide power to and/or charge electronic devices over a USB cable. In particular, a power supply provides power to the host and the host provides some of this power to the device over a USB connection. When used in this way, consumer electronic devices and furniture serve as "charging stations" for electronic devices, e.g., mobile phones, tablet computers, audio players, video players, etc., plugged into the host.

Many conventional USB charging receptacles draw power from a host power supply even when the charging receptacle is empty, i.e., when the USB charging receptacle is not mated with a USB plug (see, e.g., FIG. 1). Consequently, electrical power is provided to USB charging receptacles in the absence of a device needing a charge or needing power from the host. This use of electrical power when not needed is wasteful and can be inconvenient. As an example, for some uses, consumers provide electrical power to hosts from a battery, e.g., to eliminate the need to provide electrical power to the host over a power cord, e.g., due to the lack of convenient household (e.g., alternating current) outlets, to eliminate a physical (e.g., tripping) safety hazard, or to remove an unsightly electrical cord for aesthetic reasons. Due to the design of standard USB technology, the power drawn by USB receptacles from battery-powered hosts in the absence of plugged-in devices can result in depleting the battery, often resulting in a non-functional host and/or a host that cannot provide power to connected devices until the battery is recharged. Further, while the power (be it battery or direct/alternating current) wasted by one unused USB charging receptacle is small, the aggregate power wasted over time is enormous, e.g., costing many millions of dollars each year in wasted energy consumption.

Some previous technologies have attempted to address this problem using an external, separate switch to control electrical power provided to the USB receptacle. However, an external switch potentially lacks efficiency because use of the switch requires a user to move the switch to the "off" position to interrupt power to the USB charger receptacle and then to move the switch to the "on" position to provide power to the USB charger receptacle. If the user forgets to move the switch to the "on" position, a device plugged into the charging receptacle will not charge. Further, if a user forgets to move the switch to the "off" position when charging of a device is not needed, the USB charger receptacle will waste power and, in cases of battery-powered hosts, the wasted power will drain the battery. Another technology designed to address this problem—named the "Universal Serial Bus Power Delivery Specification"—uses a current-sensing circuit to determine if a device is plugged into a USB charging receptacle before enabling the USB charging circuit. This technology also lacks efficiency because the current-sensing circuit places the USB charging receptacle into a "sleep state" rather than completely interrupting power to it. This technology periodically provides power to the USB charging receptacle to determine if the receptacle is mated with a plug, that is, to determine if a device has been plugged in. Although the current sensing circuit may extend battery life, the current-sensing technology consistently draws power from the host, thus wasting electrical power and, in cases of battery-powered hosts, the wasted power drains the battery.

SUMMARY

Accordingly, provided herein is a technology related to a universal serial bus (USB) technology for reducing energy consumption, e.g., a USB receptacle that draws power from a host power supply only when the receptacle physically mates with a plug.

In a USB connection provided by a receptacle mated with a plug, contacts (also known as "terminals") for power transmission and contacts (or "terminals") for data transmission in the plug make electrical contact with contacts for power transmission and contacts for data transmission in the receptacle, respectively, to transmit power and/or data between the receptacle and the plug (e.g., to transit power from a host to a device and/or to transmit data between a host and a device). Thus, in some embodiments, the USB receptacle as described herein comprises USB contacts (e.g., two contacts that provide power (e.g., VCC (or VBUS) and GND) and two contacts that are used for data signals (e.g., D+ and D−).

The contacts in the receptacle are shielded with a shell (e.g., a metal shell) and the contacts in the plug are shielded with a shell (e.g., a metal shell). The shells of the receptacle and plug are not part of the electrical circuits providing power or data transmission—the shells of the plug and receptacle shield the mated electrical contacts and thus maintain the integrity of electrical signals transmitted between a plug and a receptacle, e.g., in environments comprising electrical noise. Embodiments of the technology provided herein relate to USB receptacles in which the USB receptacle shell provides an additional "insert detect" function indicating whether a plug is mated with the receptacle or if the receptacle is empty, e.g., so that power is provided to the receptacle only when the plug and receptacle are mated (e.g., and the shells of the receptacle and plug make electrical contact).

In some embodiments, the technology provides a USB receptacle comprising a shell, wherein the shell is divided into two parts—a first shell side and a second shell side. The first shell side is conductively separated from the second shell side (e.g., by a physical gap or by an electrically non-conductive material). Accordingly, the conductive separation electrically isolates the first shell side from the second shell side, minimizing and/or eliminating electrical conductivity between the first shell side and the second shell side (e.g., minimizing and/or eliminating the flow of current between the first shell side and the second shell side).

Accordingly, some embodiments of the technology relate to a universal serial bus (USB) receptacle comprising a first shell side that is physically separated from a second shell side (e.g., by a gap (e.g., a physical and electrically insulating gap (e.g., that minimizes and/or eliminates electrical contact and/or conductivity between the first shell side and the second shell side))). In some embodiments, the gap is an air gap. In some embodiments, the first shell side is separated from the second shell side by insulating material that acts to prevent conductivity between the first shell side and the second shell side. In some embodiments, the first shell side is separated from the second shell side both physically and by an insulating material (e.g., that collectively prevent electrical contact and/or conductivity between the first shell side and the second shell side).

In some embodiments, the USB receptacle further comprises a housing. As used herein, the term "housing" refers to a component of a USB receptacle or a USB plug that at least partially surrounds the shell and contacts. The housing of a plug typically comprises a polymer overmolding that provides a plug component for manipulation of the plug by a user and that comprises markings indicating that the plug is a USB plug and information concerning the proper orientation of the plug for mating with a receptacle. The housing of both the receptacle and plug provide support and strain relief to the shell and contacts to provide the plug contacts and receptacle contacts in the appropriate arrangement for the contacts to make proper electrical contact and to maximize the resiliency of repeated mating over multiple mating cycles. The housing of both the receptacle and the housing of the plug provide support to the shell of the receptacle and the shell of the plug so that the shells fit with each other properly upon mating the receptacle and plug and, in embodiments of the technology described herein, so that that the plug shell and the receptacle shell make electrically conductive contact and thus provide the USB receptacle "insert detect" technology as described herein. As provided by the technology described herein, in some embodiments, the housing holds the first shell side and the second shell side. In some embodiments, the housing holds the first shell side and the second shell side in an arrangement that separates the first shell side from the second shell side of the USB receptacle described herein.

In some embodiments, either of the first shell side or second shell side is electrically connected to a ground and the other shell side is connected to an on/off logic circuit. In some embodiments, the technology comprises an on/off logic circuit that controls delivery of power to the receptacle. In some embodiments, a charger circuit delivers power to the receptacle (e.g., to the contacts of the receptacle that provide power (e.g., that provide power to the contacts of a plug that transmit power (e.g., that transmit power to a device))). According to embodiments of the technology provided herein, mating of a plug with a receptacle comprising a split shell as described herein places the on/off logic circuit in an "on" state, which subsequently allows power to be provided from the charger circuit to the contacts of the receptacle that provide power. According to embodiments of the technology provided herein, removing a plug from a receptacle comprising a split shell as described herein places the on/off logic circuit in an "off" state, which subsequently disrupts power from being provided from the charger circuit to the contacts of the receptacle that provide power. Thus, in some embodiments the first shell side is connected to an on/off logic circuit and the second shell side is connected to ground. In some embodiments, the second shell side is connected to an on/off logic circuit and the first shell side is connected to ground. In some embodiments, mating the USB receptacle comprising a split shell as described herein with a plug causes electrical connection (e.g., an electrically conducting connection) to be made between the first shell side and the second shell side (e.g., by contact of the plug shell with both the first shell side and the second shell side of the receptacle, thus establishing an electrical connection between the on/off circuit and ground, which places the on/off circuit into the "on" state). In some embodiments, removing a plug from the USB receptacle comprising a split shell as described herein causes electrical disconnection (e.g., disrupts an electrically conducting connection) of the first shell side from the second shell side (e.g., by removing contact of the plug shell with one or both of the first shell side and/or the second shell side of the receptacle, thus breaking the electrical connection between the on/off circuit and ground, which places the on/off circuit into the "off" state).

In some embodiments, the on/off logic circuit is electrically connected to a charger circuit. In some embodiments, a charger circuit provides electric power to the power-providing contacts of a USB receptacle. In some embodiments, a charger circuit directs electric current, voltage, electric power, etc. from a power source (e.g., a source of direct current (e.g., a battery) or a source of alternating current) to a USB receptacle (e.g., to the contacts of the USB receptacle that provide power, e.g., the VCC (or VBUS) and GND contacts). According to embodiments of the technology described herein, a charger circuit directs electric current, voltage, electric power, etc. from a power source (e.g., a source of direct current (e.g., a battery) or a source of alternating current) to a USB receptacle (e.g., to the contacts of the USB receptacle that provide power, e.g., the VCC (or VBUS) and GND contacts) when the on/off logic circuit is in the "on" state, e.g., when a plug is mated with a receptacle comprising a split shell as described herein. Furthermore, embodiments provide that a charger circuit does not direct electric current, voltage, electric power, etc. from a power source (e.g., a source of direct current (e.g., a battery) or a source of alternating current) to a USB receptacle (e.g., to the contacts of the USB receptacle that provide power, e.g., the VCC (or VBUS) and GND contacts) when the on/off logic circuit is in the "off" state, e.g., when a plug is not mated with (e.g., removed from) a receptacle comprising a split shell as described herein.

In some embodiments, the charger circuit comprises the first shell side and second shell side. That is, in some embodiments, the charger circuit is not controlled by an on/off logic circuit comprising the first shell side and second shell side. Instead, in some embodiments, mating the plug with the receptacle establishes an electrical connection between the first shell side and the second shell side, thus completing the charger circuit and providing power from a power source to the contacts of the receptacle that provide power to the plug. In some embodiments in which a charger circuit comprises the first shell side and second shell side, the split shell receptacle is designed to accept only a USB plug so that other objects cannot be inserted into the receptacle, thus minimizing and/or eliminating danger to users and/or short circuits by non-plug objects completing the charger circuit in the absence of a mated plug. For example, in some embodiments in which a charger circuit comprises the first shell side and second shell side, a physical barrier allows a USB plug to mate with the receptacle but does not allow other objects to enter the receptacle and/or does not allow other objects to complete the charger circuit. In some embodiments, the USB plug comprises a component (e.g., a physical component, an electrical (e.g., conductive) component) that is specially adapted to complete the charging circuit.

In some embodiments, the charger circuit comprises a switch. That is, in some embodiments, the charger circuit is controlled by a switch (e.g., a switch that can be in an "on" or "off" state, wherein the "on" state activates the charger circuit and the "off" state deactivates the charger circuit). In some embodiments, mating the plug with the receptacle places the switch in the "on" state, thus completing the charger circuit and providing power from a power source to the contacts of the receptacle that provide power to the plug. In some embodiments, the switch is a physical switch and physical contact of the plug with the switch places the switch into the "on" state. In some embodiments, the switch is a magnetic switch and the plug comprises a magnet or magnetic material that places the switch into an "on" state when the plug is mated with the receptacle. In some embodiments, the switch comprises a proximity sensor or an optical sensor that places the switch into the "on" state when the plug is mated with the receptacle. Accordingly, in embodiments in which the charger circuit comprises a switch (e.g., a physical, magnetic, on sensor-based switch), removing the plug from the receptacle places the switch in an "off" state and the charger circuit is broken. In some embodiments, a spring or other mechanical component places the switch into an "off" state when the plug is not mated with the receptacle.

The technology is not limited in the materials from which the split shell receptacle is manufactured, provided that the split shell receptacle operates according to the technology described herein. For example, in some embodiments, the two sides of the split shell comprise a conducting material, e.g., a metal or metal alloy, e.g., iron or iron alloy, stainless steel, carbon steel, lead or lead alloy, copper or copper alloy, tin or tin alloy, gold or gold alloy, platinum or platinum alloy, silver or silver alloy, aluminum or aluminum alloy, zinc or zinc alloy, nickel or nickel alloy, brass, bronze, graphite or other form of carbon materials that conduct electricity. In some embodiments, the two sides of the split shell comprise the same material and in some embodiments the two sides of the split shell comprise a different a material.

Further, the technology is not limited in the material that provides the gap, provided that the gap physically and/or electrically separates the first shell side from the second shell side and decreases, minimizes, and/or eliminates electrical contact between the first shell side and the second shell side. In some embodiments, the gap is an air gap; in some embodiments, the gap is a vacuum gap (e.g., in environments where air is not present). In some embodiments, the gap is provided by an insulator that separates the first shell side from the second shell side, e.g., an insulator that is a non-conducting polymer (e.g., plastic, rubber, silicone, etc.), glass, a non-conducting organic material, paper, quartz, ceramic, etc.

The technology is not limited in the size of the gap between the first shell side and the second shell side provided the gap physically and/or electrically separates the first shell side from the second shell side and thus minimizes and/or eliminates electrical contact between the first shell side and the second shell side. For example, in some embodiments, the size of the gap is approximately 0.1 cm to 1 cm (e.g., approximately 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1 cm).

The charger circuit connected to or comprised by an embodiment of the split shell USB receptacle technology described herein provides a voltage at the USB receptacle (e.g., at the USB receptacle terminals) of approximately 0 V DC (e.g., less than approximately 0.5 V, e.g., less than approximately 0.5, 0.45, 0.4, 0.35, 0.3, 0.25, 0.2, 0.15, 0.1, or 0.05 V) and/or draws a current from the power supply of less than approximately 0.5 mA (e.g., less than approximately 0.5, 0.45, 0.4, 0.35, 0.3, 0.25, 0.2, 0.15, 0.1, or 0.05 mA) and/or consumes less than approximately 9 mW (e.g., less than approximately 10, 9.5, 9, 8.5, 8, 7.5, 7, 6.5, 6, 5.5, 5, 4.5, 4, 3.5, 3, 2.5, 2, 1.5, 1, 0.9, 0.8, 0.7, 0.6, 0.5, 0.4, 0.3, 0.25, 0.2, 0.15, 0.1, 0.05, or 0 mW) from the power supply when the receptacle is unoccupied by a USB plug (e.g., when a USB plug is not mated with the split shell USB receptacle).

The technology described herein is not limited in the physical orientation of the plug or receptacle provided that the plug can be inserted into the receptacle to make an electrical connection between the two sides of the split shell. For example, in some embodiments, the physical orientation is vertical, 90 degree horizontal, 90 degree vertical, diagonal, etc., including angular increments between these orientations (e.g., increments of 5, 10, 15, 20, 25, 30, 35, 40, 45, 50, 55, 60, 65, 70, 75, 80, or 85 degrees between a horizontal and vertical orientation). The technology is not limited in the type of mounting of the split shell receptacle in a host. For example, embodiments of the technology comprise a split shell receptacle mounted in a host by through hole soldering, surface mount soldering, a panel mount, etc.

The technology is not limited in the type of USB connector. For example, embodiments of the technology provide a USB-A standard receptacle comprising a split shell, a USB-A mini receptacle comprising a split shell, and a USB-A micro receptacle comprising a split shell. Additional embodiments provide a USB-B standard receptacle comprising a split shell, a USB-B mini receptacle comprising a split shell, and a USB-B micro receptacle comprising a split shell. Yet further embodiments provide a USB-C receptacle comprising a split shell. The technology is not limited in the USB specification describing the USB receptacles, plugs, protocols, etc. For instance, embodiments of the technology provide a USB receptacle comprising a split shell and otherwise operating according to USB 1.0, USB 1.1, USB 2.0, USB 3.0, USB 3.1, etc. Related embodiments comprise a USB charging system comprising a USB receptacle comprising a split shell and a USB plug, wherein the system operates according to USB 1.0, USB 1.1, USB 2.0, USB 3.0, USB 3.1.

The technology is not limited in the operational ratings of the components. For example, the split shell receptacle and charging system described herein operate over a wide range of temperatures, voltages, currents, mating cycles, etc. The technology, in some embodiments, operates with currents from, e.g., approximately 1 mA to 100 A (e.g., approximately 1, 10, 20, 30, 40, 50, 60, 70, 80, 90, 100, 200, 300, 400, 500, 600, 700, 800, or 900 mA, 1, 10, 20, 30, 40, 50, 60, 70, 80, 90, or 100 A). USB supplies bus power across VCC and GND at a nominal voltage 5 V±5%. Voltage drops and losses in providing bus power result in voltages provided in the range of approximately 4.4 to 5.25 V by USB 2.0 and 4.45 to 5.25 by USB 3.0. The technology is not, however, limited to these voltages and operates, in some embodiments, with voltages of, e.g., approximately 1 to 100 V (e.g., approximately 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 30, 40, 50, 60, 70, 80, 90, or 100 V). Further, the technology is not limited in the power provided, e.g., in some embodiments, the power provided by a charging system according to embodiments described herein is, e.g., approximately 1 mW to 100 W (e.g., approximately 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95, or 100 mW and/or 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95, or 100 W).

In some embodiments, the technology provides a universal serial bus (USB) charging system. For example, in some embodiments, the technology provides a USB charging system comprising a USB receptacle comprising USB terminals and a first shell side physically and/or electrically separated from a second shell side (e.g., by a gap); a charger circuit; and a power supply. In some embodiments, the charger circuit provides a voltage (e.g., from the power supply) of approximately 0 V DC to the USB terminals (e.g., when the USB receptacle is unoccupied by (not mated with) a USB plug). In some embodiments, the charger circuit consumes less than approximately 0.3 mA from the power supply (e.g., when the USB receptacle is unoccupied by (not mated with) a USB plug). In some embodiments, the charger circuit consumes approximately 0 mA from the power supply (e.g., when the USB receptacle is unoccupied by (not mated with) a USB plug). In some embodiments, the charger circuit consumes less than approximately 9 mW from the power supply (e.g., when the USB receptacle is unoccupied by (not mated with) a USB plug).

Further embodiments of the USB charging system further comprise a USB plug. In related embodiments of the USB charging system, the system further comprises a USB plug that is mated with (e.g., "plugged into") the USB receptacle. In some embodiments, the system further comprises a USB plug that is mated with (e.g., "plugged into") the USB receptacle and the USB plug electrically connects the first shell side and the second shell side.

The technology is not limited in the USB plug that mates with the split shell USB receptacle described herein. In some embodiments, the USB charging system comprises a conventional USB plug that mates with the split shell USB receptacle to initiate providing power to the USB contacts of the receptacle that provide power (e.g., mating the USB receptacle comprising a split shell as described herein with a plug causes electrical connection (e.g., an electrically conducting connection) to be made between the first shell side and the second shell side (e.g., by contact of the plug shell with both the first shell side and the second shell side of the receptacle, thus establishing an electrical connection between the on/off circuit and ground, which places the on/off circuit into the "on" state and which, in some embodiments, allows a charger circuit to provide electric current, voltage, electric power, etc. from a power source (e.g., a source of direct current (e.g., a battery) or a source of alternating current) to the USB receptacle (e.g., to the contacts of the USB receptacle that provide power, e.g., the VCC (or VBUS) and GND contacts).

In some embodiments, the USB charging system comprises a plug specifically designed to mate with a receptacle comprising a split shell as described herein. For instance, in some embodiments, a plug is designed to have an improved (e.g., increased) physical contact with the first shell side and the second shell side of the USB receptacle comprising a split shell, e.g., by increasing the firmness and/or pressure of the plug shell at an appropriate site on the receptacle split shell to provide and/or maintain an improved electrical contact between the first shell side and the second shell side. For instance, in some embodiments, the plug comprises a mechanical component (e.g., a spring, brushing, etc.) that presses a conducting component of the plug shell with an increased firmness at the site of contact between the first shell side and the second shell side to establish electrical contact between the first shell side and the second shell side.

In some embodiments, a plug is designed to have an improved (e.g., increased) electrical contact with the first shell side and the second shell side of the USB receptacle comprising a split shell, e.g., by increasing the conductivity of the plug shell at an appropriate site to provide increased and/or more efficient current flow between the first shell side and the second shell side. For example, in some embodiments, a plug shell has a material at the site of contact between the first shell side and the second shell side that is different than the remainder of the plug shell, e.g., in some embodiments the plug shell is mainly made of a first material (e.g., stainless steel) and comprises another metal (e.g., silver, copper, gold, aluminum, zinc, nickel, brass, bronze, iron or platinum) at the site that makes contact with the first shell side and the second shell side to establish electrical contact between the first shell side and the second shell side.

For example, in some embodiments the long dimension of the receptacle shell is divided by the gap approximately in half to provide a first shell side and a second shell side of approximately the same length in the long dimension of the receptacle shell (see, e.g., FIGS. 2A and 2B; see FIGS. 4A and 4B). However, the technology is not limited to this arrangement and encompasses designs in which the gap divides the long dimension of the receptacle shell at other positions. In some embodiments, the gap divides the receptacle shell to provide a first shell side and a second shell side having lengths in the long dimension of the receptacle shell that have a ratio of approximately 1:2 (e.g., the gap divides the receptacle shell into a first shell side having a length approximately ⅓ the length of the long dimension of the receptacle shell and a second shell side having a length approximately ⅔ the length of the long dimension of the receptacle shell). In some embodiments, the gap divides the receptacle shell to provide a first shell side and a second shell side having lengths in the long dimension of the receptacle shell that have a ratio of approximately 1:3 (e.g., the gap divides the receptacle shell into a first shell side having a length approximately ¼ the length of the long dimension of the receptacle shell and a second shell side having a length approximately ¾ the length of the long dimension of the receptacle shell). In some embodiments, the gap divides the receptacle shell to provide a first shell side and a second shell side having lengths in the long dimension of the receptacle shell that have a ratio of approximately 1:4 (e.g., the gap divides the receptacle shell into a first shell side having a length approximately ⅕ the length of the long dimension of the receptacle shell and a second shell side having a length approximately ⅘ the length of the long dimension of the receptacle shell). In some embodiments, the gap divides the receptacle shell to provide a first shell side and a second shell side having lengths in the long dimension of the receptacle shell that have a ratio of approximately 1:5 (e.g., the gap divides the receptacle shell into a first shell side having a length approximately ⅙ the length of the long dimension of the receptacle shell and a second shell side having a length approximately ⅚ the length of the long dimension of the receptacle shell). The technology is not limited to these illustrative embodiments and is intended to include other ratios and proportions for the first and/or second shell sides where the gap divides the long dimension of the receptacle shell to provide a first and/or second shell side that has a length that is, e.g., 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95 of the length of the long dimension of the receptacle shell.

For example, in some embodiments the short dimension of the receptacle shell is divided by the gap approximately in half to provide a first shell side (e.g., a "top shell side") and a second shell side (e.g., a "bottom shell side") of approximately the same length in the short dimension of the receptacle shell. However, the technology is not limited to this arrangement and encompasses designs in which the gap divides the short dimension at other positions. In some embodiments, the gap divides the receptacle shell to provide a top shell side and a bottom shell side having lengths in the short dimension of the receptacle shell that have a ratio of approximately 1:2 (e.g., the gap divides the receptacle shell into a top shell side having a length approximately ⅓ the length of the short dimension of the receptacle shell and a bottom shell side having a length approximately ⅔ the length of the short dimension of the receptacle shell). In some embodiments, the gap divides the receptacle shell to provide a top shell side and a bottom shell side having lengths in the short dimension of the receptacle shell that have a ratio of approximately 1:3 (e.g., the gap divides the receptacle shell into a top shell side having a length approximately ¼ the length of the short dimension of the receptacle shell and a bottom shell side having a length approximately ¾ the length of the short dimension of the receptacle shell). In some embodiments, the gap divides the receptacle shell to provide a top shell side and a bottom shell side having lengths in the short dimension of the receptacle shell that have a ratio of approximately 1:4 (e.g., the gap divides the receptacle shell into a top shell side having a length approximately ⅕ the length of the short dimension of the receptacle shell and a bottom shell side having a length approximately ⅘ the length of the short dimension of the receptacle shell). In some embodiments, the gap divides the receptacle shell to provide a top shell side and a bottom shell side having lengths in the short dimension of the receptacle shell that have a ratio of approximately 1:5 (e.g., the gap divides the receptacle shell into a top shell side having a length approximately ⅙ the length of the short dimension of the receptacle shell and a bottom shell side having a length approximately ⅚ the length of the short dimension of the receptacle shell). The technology is not limited to these illustrative embodiments and is intended to include other ratios and proportions for the first and/or bottom shell sides where the gap divides the short dimension of the receptacle shell to provide a first and/or bottom shell side that has a length that is, e.g., 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95 of the length of the short dimension of the receptacle shell.

In some embodiments, the technology provides a USB receptacle comprising a first shell side and a second shell side or a top shell side and a bottom shell side in a particular configuration and/or geometry to mate with a USB plug such that the plug establishes electrical contact between the first shell side and the second shell side or top shell side and bottom shell side when the specifically designed USB plug is mated with the USB receptacle comprising a first shell side and a second shell side or top shell side and bottom shell side in said particular configuration, e.g., as described above. Embodiments provide various configurations of the first shell side and the second shell side or top shell side and bottom shell side and, in some embodiments, appropriately designed plugs for mating with the receptacle and electrically connecting the first shell side to the second shell side or top shell side and bottom shell side.

In some embodiments of the USB charging system provided herein, the charger circuit provides a voltage (e.g., from the power supply) of more than 0 V DC to the USB receptacle (e.g., to the USB receptacle terminals) (e.g., when the USB receptacle is mated with a USB plug). In some embodiments of the USB charging system provided herein, the charger circuit consumes more than approximately 0.3 mA from the power supply (e.g., when the USB receptacle is mated with a USB plug). In some embodiments of the USB charging system provided herein, the charger circuit provides a voltage (e.g., from the power supply) of approximately 5 V DC to the USB receptacle (e.g., to the USB receptacle terminals) (e.g., when the USB receptacle is mated with a USB plug). In some embodiments of the USB charging system provided herein, the charger circuit consumes approximately 8 mA from the power supply (e.g., when the USB receptacle is mated with a USB plug). In some embodiments of the USB charging system provided herein, the charger circuit consumes more than approximately 9 mW from the power supply (e.g., when the USB receptacle is mated with a USB plug). In some embodiments of the USB charging system provided herein, the charger circuit consumes more than approximately 0.25 W from the power supply (e.g., when the USB receptacle is mated with a USB plug).

In some embodiments of the USB charging system provided herein, the USB charging system further comprises an on/off logic circuit. As used herein, the term "on/off logic circuit" refers to a circuit that controls delivery of power to the receptacle. For example, in some embodiments an on/off logic circuit is electrically connected to a charger circuit. In some embodiments, the on/off logic circuit sets an enable/disable pin of the charger circuit to place the charger circuit into an "on" or "off" mode, e.g., to enable or disable the charger circuit, respectively. In some embodiments, the USB charging system comprises a USB receptacle comprising a split shell, e.g., comprising a first shell side or a second shell side that is connected to ground and electrically isolated from the other shell side that is not connected to ground; the other shell side that is not connected to ground is connected to the on/off logic circuit. In some embodiments, establishing an electrical connection between the first shell side and the second shell side consequently causes the on/off logic circuit to set the enable/disable pin to enable (e.g., "turn on") the charger circuit and thus provide power to the USB receptacle, e.g., to the contacts of the USB receptacle that provide power to a USB plug mated with the receptacle.

In some embodiments, the USB charging system comprises a power supply that is a source of direct current. In some embodiments, the power supply is a battery. In some embodiments, the USB charging system comprises a power supply that is a source of alternating current.

Related embodiments provide a kit for upgrading a universal serial bus (USB) receptacle to reduce energy usage. For example, in some embodiments a kit comprises a USB receptacle comprising a split shell as described herein. Yet other related embodiments provide a kit comprising a USB charging system comprising a USB receptacle comprising a split shell as described herein.

Some embodiments of the technology are related to methods, e.g., methods for charging a universal serial bus (USB) device. For example, in some embodiments, methods are provided comprising steps of, e.g., providing a USB device comprising a USB plug; providing a universal serial bus (USB) charging system comprising a USB receptacle comprising USB terminals and a first shell side physically and/or electrically separated from a second shell side (e.g., by a gap); a charger circuit; and a power supply; and mating said USB plug to said USB receptacle. According to embodiments of the technology, mating said USB plug to said USB receptacle comprising a first shell side physically and/or electrically separated from a second shell side (e.g., by a gap) establishes an electrical connection across the gap, e.g., establishes an electrical connection between the first shell side and the second shell side. In some embodiments, establishing an electrical connection between the first shell side and the second shell side consequently causes an on/off logic circuit to enable (e.g., "turn on") the charger circuit. In some embodiments, enabling the on/off charger circuit causes power to be delivered from the power supply to the USB receptacle terminals, which provide power to the USB plug mated with the USB receptacle.

Related embodiments of methods comprise a step of removing said USB plug from said USB receptacle. In some embodiments, removing said USB plug from said USB receptacle breaks the electrical connection across the gap, e.g., breaks the electrical connection between the first shell side and the second shell side. In some embodiments, breaking the electrical connection between the first shell side and the second shell side consequently causes an on/off logic circuit to disable (e.g., "turn off") the charger circuit. In some embodiments, disabling the on/off charger circuit decreases, minimizes, and/or stops delivery of power from the power supply to the USB receptacle terminals.

For example, in some embodiments, removing said USB plug from said USB receptacle reduces the current consumed by the charger circuit to less than 0.3 mA. In some embodiments, removing said USB plug from said USB receptacle reduces the voltage at the USB receptacle to approximately 0 V. In some embodiments, removing said USB plug from said USB receptacle reduces the power consumed by the charger circuit to less than 9 mW.

In some embodiments of methods, the USB charging system comprises a power supply that is a battery.

Embodiments of the technology find use in various consumer and household goods. As a non-limiting example, in some embodiments, a furniture item comprises a USB receptacle comprising a split shell as described herein. In some embodiments, a furniture item comprises a USB charging system comprising a USB receptacle comprising a split shell as described herein. Related embodiments relate to use of a USB receptacle comprising a split shell as described herein for charging a USB device. Other related embodiments relate to use of a charging system comprising a USB receptacle comprising a split shell as described herein for charging a USB device.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

In FIG. 4A, the split shell USB receptacle is not mated with the USB plug (e.g., the USB plug is not "plugged in" to the split shell USB receptacle) and the two sides of the split shell do not make electrical contact.

In FIG. 4B, the split shell USB receptacle is mated with the USB plug (e.g., the USB plug is "plugged in" to the split shell USB receptacle) and the shell of the plug establishes an electrical connection across the gap and between the two sides of the split shell.

Figure 1:
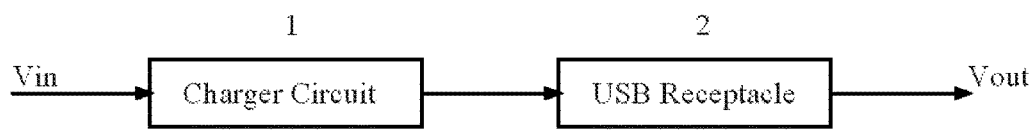
FIG. 1 is a schematic showing the components of a conventional USB Receptacle charger that draws power from a host power supply when the charging receptacle is not occupied by a plug. The Charger Circuit 1 receives an input voltage from a power source. The input voltage is then converted to 5 V DC by the Charger Circuit 1 and sent to the USB Receptacle 2. A USB cord is then mated with the USB Receptacle 2 to charge a device. In a conventional USB receptacle, the Charger Circuit 1 is always on, so it is always drawing power from the power source.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

USB chargers integrated into consumer products (e.g., a host comprising a USB receptacle) are typically connected to a household current source and, accordingly, are provided with a constant power source. When the chargers are not in use (e.g., when a device USB plug is not mated with (e.g., inserted into) a host USB receptacle), the current draws on these circuits by the unoccupied receptacles are very small, and although energy waste occurs, the amount can be inconsequential per USB receptacle. Thus, users do not have a compelling reason to power down USB chargers. Consequently, producers of USB components and devices comprising USB receptacles or USB chargers have not developed improved designs to replace extant USB connectors. While "green energy" developments and the proliferation of battery-powered USB hosts comprising USB charging receptacles have increased awareness of the power wasting problems of conventional USB receptacles, present attempts to address the problem have been insufficient. For example, some attempts have been made to implement kludgy design-arounds to minimize the power wasting shortcomings of USB connectors rather than develop improved technologies. While the "Universal Serial Bus Power Delivery Specification" provides guidance for detecting the insertion of a plug into a receptacle ("insert detection"), manufacturers have not adopted these new designs due to limitations of the connector style, complicated design and pinout assignments, and the increased cost.

Accordingly, provided herein is technology related to a universal serial bus (USB) technology for reducing energy consumption, e.g., a USB receptacle that draws power from a host power supply when the receptacle is mated with a plug.

As described herein, embodiments of the technology relate to a USB receptacle comprising a split shell, e.g., a USB receptacle comprising a first shell side and a second shell side that are conductively separated from one another (e.g., by a physical gap or by an electrically non-conductive material). That is, e.g., embodiments of the technology relate to a USB receptacle comprising a first shell side that is physically separated from a second shell side (e.g., by a gap (e.g., a physical and electrically insulating gap (e.g., that minimizes and/or eliminates electrical contact and/or conductivity between the first shell side and the second shell side))). Embodiments of the technology comprise an on/off logic circuit that is placed into an "on" state when a plug is mated with the USB receptacle comprising a split shell and the plug shell conductively connects the first shell side and the second shell side. Embodiments of the technology comprise an on/off logic circuit that is placed into an "off" state when a plug is removed from the USB receptacle comprising a split shell and the first shell side is conductively disconnected from the second shell side. Embodiments comprise a charger circuit that provides power to the USB receptacle when the on/off logic circuit is in the "on" state and that disrupts, eliminates, and/or minimizes power to the USB receptacle when the on/off logic circuit is in the "off" state.

Thus, according to embodiments of the technology, the split shell USB receptacle provides an "insert detect" technology, e.g., a technology to disable a USB charger circuit (e.g., as provided by a host USB receptacle providing a charging function) when the USB plug is removed from the split shell USB receptacle. Accordingly, embodiments of the technology provide for integrating USB controls and chargers into commercial products that are powered by a battery without risk of prematurely draining the battery. Furthermore, embodiments of the split shell USB receptacle have a design that is easier to manufacture than other solutions that attempt to address the problem of current draw (e.g., a separate on/off switch or a current sensing circuit that intermittently draws current to check receptacle status (e.g., mated or not mated with a USB plug)). Embodiments of the technology provided herein can be integrated across all USB receptacle types without increases in the cost of manufacture.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is generally equivalent to the term "and/or" unless the context clearly dictates otherwise. For example, embodiments of the technology comprise a "split shell" USB receptacle comprising a first "shell side" that is connected to ground and a second "shell side" that is connected to an on/off logic circuit. Accordingly, in descriptions of the split shell USB receptacle stating that a first shell side or a second shell side is connected to ground, the "or" is intended to be an "exclusive or" meaning that only one of ("either") the first shell side or the second shell side is connected to ground. Similarly, in descriptions of the split shell USB receptacle stating that the first shell side or the second shell side is connected to an on/off logic circuit, the "or" is intended to be an "exclusive or" meaning that only one of ("either") the first shell side or the second shell side is connected to an on/off logic circuit.

The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the term "USB" refers to a serial bus standard for interfacing devices to a host computer or other device. The term "USB" is intended to include prior, current, and future versions of the Universal Serial Bus (USB) standard and similar standards, e.g., USB standards including, without limitation, USB 2.0 entitled "Universal Serial Bus Specification—Revision 2.0" dated Apr. 27, 2000 and USB 3.0 entitled "Universal Serial Bus Specification 3.0—Revision 1.0" dated Nov. 12, 2008, each of the foregoing being incorporated herein by reference in its entirety, and any subsequent versions thereof.

The architecture of a USB connection comprises a host, one or more host USB receptacles, and one or more devices connected to the host, e.g., by a USB plug. USB plugs and USB receptacles each comprise a number of components, including but not limited to terminals (e.g., USB plug terminals and USB receptacle terminals), e.g., that carry data signals and/or power; a shell (e.g., USB plug shell and USB receptacle shell); and a housing (e.g., USB plug housing and USB receptacle housing). As described herein, a USB receptacle provides a receiving component (e.g., a port) to a host or device and the USB receptacle is configured to accept a USB plug—thus, a USB receptacle is usually a female connector. In particular, a USB receptacle comprises a shell that surrounds and physically protects the USB receptacle contacts (e.g., terminals). In addition, the USB receptacle shell electrically shields the USB receptacle contacts (e.g., terminals) and minimizes and/or eliminates external electrical interference that may compromise the integrity of signals carried by the USB receptacle contacts (e.g., terminals). In embodiments of the technology as provided herein, the USB receptacle shell is divided into two parts—a first shell side and a second shell side that are physically and/or electrically isolated from each other. In embodiments of the technology, upon insertion of a USB plug with the USB receptacle technology described herein, the first shell side and the second shell side of the USB receptacle both make contact with the USB plug shell, e.g., to conductively connect the first shell side and the second shell side of the split shell USB receptacle described herein (e.g., and thus complete a circuit comprising the first shell side and the second shell side, e.g., to control provision of power to the USB contacts).

USB connections are directional and electrical power is only provided by downstream facing receptacles to prevent electrical overloads and damaged equipment. Accordingly, USB cables have different ends called "A" and "B"; in some embodiments, the USB A-type end and B-type end have different physical connectors. Therefore, in some embodiments, a USB connection comprises four different connectors: a plug and receptacle for each of the A and B ends. In general, USB cables comprise plugs on their ends and hosts and devices comprise receptacles. A receptacle "mates" with a plug to form a connection between the receptacle and the plug. Further, in some embodiments, hosts generally comprise A-type receptacles and devices generally comprise B-type receptacles. Generally, the A-type end is usually a standard format USB plug that mates with a standard format USB receptacle (e.g., as provided by a host) and the B-type end can vary, e.g., a standard USB plug, mini USB plug, micro USB plug, or non-standard USB plug. In some embodiments, A-type receptacles on host devices supply power over a USB connection to B-type receptacles on target devices.

As used herein, a "host" refers to an apparatus or other item that comprises a USB receptacle and that provides electrical power to the USB receptacle, e.g., for providing power through a plug mated with the host receptacle and through a cable to a device, e.g., through a plug at the other, device end of the cable mated with a receptacle on the device.

As used herein, a "device" refers to an apparatus or other item that comprises a USB receptacle and that is capable of being powered by and/or capable of being charged by drawing power from a host over a USB connection. Accordingly, examples of a "device" include, but are not limited to, a battery, a light, a mobile phone, a tablet, a computer, an audio speaker, and the like.

As used herein, the term "plug" refers to the end of a USB cable, usually a male connector. A USB plug comprises a USB plug shell that surrounds and protects the USB plug contacts. In addition, the USB plug shell shields the USB plug contacts and minimizes and/or eliminates external electrical interference that may compromise the integrity of signals carried by the USB plug contacts. In embodiments of the technology as provided herein, the plug shell makes contact with the receptacle shell, e.g., to conductively connect the first shell side and the second shell side of the split shell USB receptacle described herein (e.g., and thus complete a circuit comprising the first shell side and the second shell side, e.g., to control provision of power to the USB contacts).

As used herein, the term "receptacle" refers to a port of a host or device that is configured to accept a plug and thus is usually a female connector. A USB receptacle comprises a shell that surrounds and protects the USB receptacle contacts. In addition, the USB receptacle shell shields the USB receptacle contacts and minimizes and/or eliminates external electrical interference that may compromise the integrity of signals carried by the USB receptacle contacts. In embodiments of the technology as provided herein, the first shell side and the second shell side of the receptacle make contact with the plug shell, e.g., to conductively connect the first shell side and the second shell side of the split shell USB receptacle described herein (e.g., and thus complete a circuit comprising the first shell side and the second shell side, e.g., to control provision of power to the USB contacts).

Accordingly, in some embodiments a USB connector mounted on a host or device is called a "receptacle" and a connector attached to a cable is called a "plug".

When used in reference to a component of a USB receptacle or a USB plug, the term "shell" refers to a component of the USB receptacle or USB plug that surrounds the data and power contacts of the USB receptacle and USB plug. The shell is made from an electrically conductive material (e.g., metal, e.g., stainless steel) and shields the contacts from electrical interference from external sources. The shell of the receptacle and the shell of the plug conductively contact each other when the receptacle and the plug are mated.

As used herein, the term "mated" or "mated state" refers to a USB plug or a USB receptacle when the USB plug and the USB receptacle are interfaced, connected, etc., to make a physical and/or electrical connection between the receptacle and the plug (e.g., between the USB plug terminals and the USB receptacle terminals). As used herein, a "mated USB plug" is inserted into a USB receptacle and a "mated USB receptacle" has a USB plug inserted into it. In some embodiments, "mating" a USB receptacle (e.g., a split shell USB receptacle as provided herein) with a USB plug establishes an electrical connection between the first shell side and the second shell side of the split shell USB receptacle, e.g., in some embodiments the USB plug shell electrically connects the first shell side and the second shell side of the split shell USB receptacle. The term "unmated" or "unmated state" refers to a USB receptacle that is not mated with a USB plug (e.g., an "unmated USB receptacle" does not have a USB plug inserted into it). Similarly, the term "unmated" or "unmated state" refers to a USB plug that is not mated with a USB receptacle (e.g., an "unmated USB plug" is not inserted into a USB receptacle).

As used herein, the term "split shell USB receptacle" refers to a USB receptacle comprising a shell, wherein the shell is divided into two parts—a first shell side and a second shell side. The first shell side is conductively separated from the second shell side (e.g., by a physical gap or by an electrically non-conductive material). Accordingly, the conductive separation (e.g., provided by the gap) electrically isolates the first shell side from the second shell side, minimizing and/or eliminating electrical conductivity between the first shell side and the second shell side (e.g., minimizing and/or eliminating the flow of current between the first shell side and the second shell side).

As used herein, the term "on/off logic circuit" refers to a circuit that controls delivery of power (e.g., from a power source (e.g., a source of direct current (e.g., a battery)) or a source of alternating current) to the receptacle. As used herein, when the on/off logic circuit is in an "on" state, the on/off logic circuit enables power (e.g., current, voltage, wattage, etc.) to be provided from a power source to the receptacle (e.g., to and/or across the power contacts of the receptacle (e.g., to the VCC or $V_{BUS}$ contact and to the GND contact)). As used herein, when the on/off logic circuit is in an "off" state, the on/off logic circuit disables, stops, and/or minimizes the power (e.g., current, voltage, wattage, etc.) being provided from a power source to the receptacle (e.g., to and/or across the power contacts of the receptacle (e.g., to the VCC or VBUS contact and to the GND contact)).

As used herein, a "charger circuit" is a circuit that provides electric power to the power-providing contacts of a USB receptacle, e.g., for providing power to a USB plug mated with the USB receptacle, e.g., for providing power to a device connected by a USB cable comprising a USB plug mated to the USB receptacle. For example, in some embodiments a charger circuit electrically connects a power source (e.g., a source of direct current (e.g., a battery) or a source of alternating current) to a USB receptacle (e.g., to the contacts of the USB receptacle that provide power, e.g., the VCC (or VBUS) and GND contacts) and provision of power from the charger circuit to the USB receptacle is controlled by an on/off logic circuit. Accordingly, in some embodiments a charger circuit comprises a power source, a USB receptacle, and an on/off logic circuit (e.g., acting as a switch controlling current flow through the charger circuit).

As used herein, the term "charging system" refers to a system comprising one or more components for providing power to a USB device (e.g., to power the device and/or to charge a battery of the device). For example, in some embodiments a charging system comprises a power source (e.g., a source of direct current (e.g., a battery) or a source of alternating current) and a USB split shell receptacle as described herein. In some embodiments, a charging system comprises a power source (e.g., a source of direct current (e.g., a battery) or a source of alternating current), a USB split shell receptacle as described herein, and a USB device. In some embodiments, a charging system comprises a power source (e.g., a source of direct current (e.g., a battery) or a source of alternating current), a USB split shell receptacle as described herein, and a USB device comprising a USB plug configured to mate with the USB split shell receptacle as described herein. In some embodiments, a charging system comprises a power source (e.g., a source of direct current (e.g., a battery) or a source of alternating current), a USB split shell receptacle as described herein, and a charger circuit, e.g., to provide power from the power source to the USB split shell receptacle. In some embodiments, a charging system comprises a power source (e.g., a source of direct current (e.g., a battery) or a source of alternating current), a USB split shell receptacle as described herein, and an on/off logic circuit, e.g., to control the provision of power from the power source to the USB split shell receptacle. In some embodiments, a charging system comprises a power source (e.g., a source of direct current (e.g., a battery) or a source of alternating current), a USB split shell receptacle as described herein, a charger circuit (e.g., to provide power from the power source to the USB split shell receptacle), and an on/off logic circuit (e.g., to control the provision of power from the power source to the USB split shell receptacle).

As used herein, the term "source voltage gate circuit" refers to a circuit that automatically connects or disconnects a power source to a charging circuit depending on the presence or absence, respectively, of current flowing between the first and second shell sides in a split shell USB receptacle. In some embodiments, the source voltage gate circuit is a solid state component (e.g., a FET (e.g., a MOSFET)) and in some embodiments the source voltage gate circuit is an electromechanical component (e.g., a relay, a magnetic switch, etc.). In particular embodiments, a source voltage gate circuit finds use in embodiments in which a charger circuit is not controlled by an on/off logic circuit and/or in embodiments in which a charger circuit does not comprise an enable/disable logic pin.

As used herein, the term "USB split shell detect circuit" refers to a circuit comprising a split shell USB receptacle (e.g., comprising a first shell side physically and/or electrically separated from a second shell side) that is an incomplete circuit (e.g., no electricity flows to or through the circuit) in the absence of a mated USB plug and is a complete circuit (e.g., electricity flows to or through the circuit) when a USB plug is mated with the split shell USB receptacle. Accordingly, a "USB split shell detect circuit" is a circuit comprising a split shell USB receptacle that functions to detect the presence or absence of a plug in the split shell receptacle.

As used herein, the term "insert detect" or "insert detection" refers to a signal produced and/or a signal detected indicating that a USB plug is mated with ("inserted into") a USB receptacle (e.g., a USB receptacle comprising a split shell as described herein). In some embodiments, insert detect is a function provided by a circuit that produces a detectable electric and/or electronic signal indicating that a USB plug is mated with ("inserted into") a USB receptacle (e.g., a USB receptacle comprising a split shell as described herein). In some embodiments, the detectable electric and/or electronic signal indicating that a USB plug is mated with ("inserted into") a USB receptacle (e.g., a USB receptacle comprising a split shell as described herein) is detected by another component of the technology described herein (e.g., an on/off logic circuit) wherein said component is placed into a particular state (e.g., "on") upon detecting the insert detect signal.

Description

The technology described herein relates to enabling and disabling electrical power provided by a USB receptacle when a plug is inserted and removed, respectively. In particular, the technology provides a USB plug comprising a "split shell" design in which the electrical circuit providing power to the USB receptacle is enabled only when the plug is inserted into the receptacle (e.g., mating the plug and split shell receptacle completes an on/off logic circuit, which subsequently allows a charger circuit to provide power from a power source to the USB receptacle). Removing the plug from the receptacle disables the circuit providing electrical power to the split shell receptacle (e.g., removing the plug from the split shell receptacle interrupts an on/off logic circuit, which subsequently eliminates and/or minimizes the provision of power from a power source to the USB receptacle by the charger circuit). Accordingly, the technology comprising a USB receptacle comprising the "split shell" design detects the presence of an inserted (mated) USB plug and automatically enables the charger circuit and detects removal of a USB plug and automatically disables the charger circuit when the receptacle is empty, e.g., does not have a plug inserted. Although the disclosure herein refers to certain illustrated embodiments, it is to be understood that these embodiments are presented by way of example and not by way of limitation.

Split Shell USB Receptacle

Figure 2A:
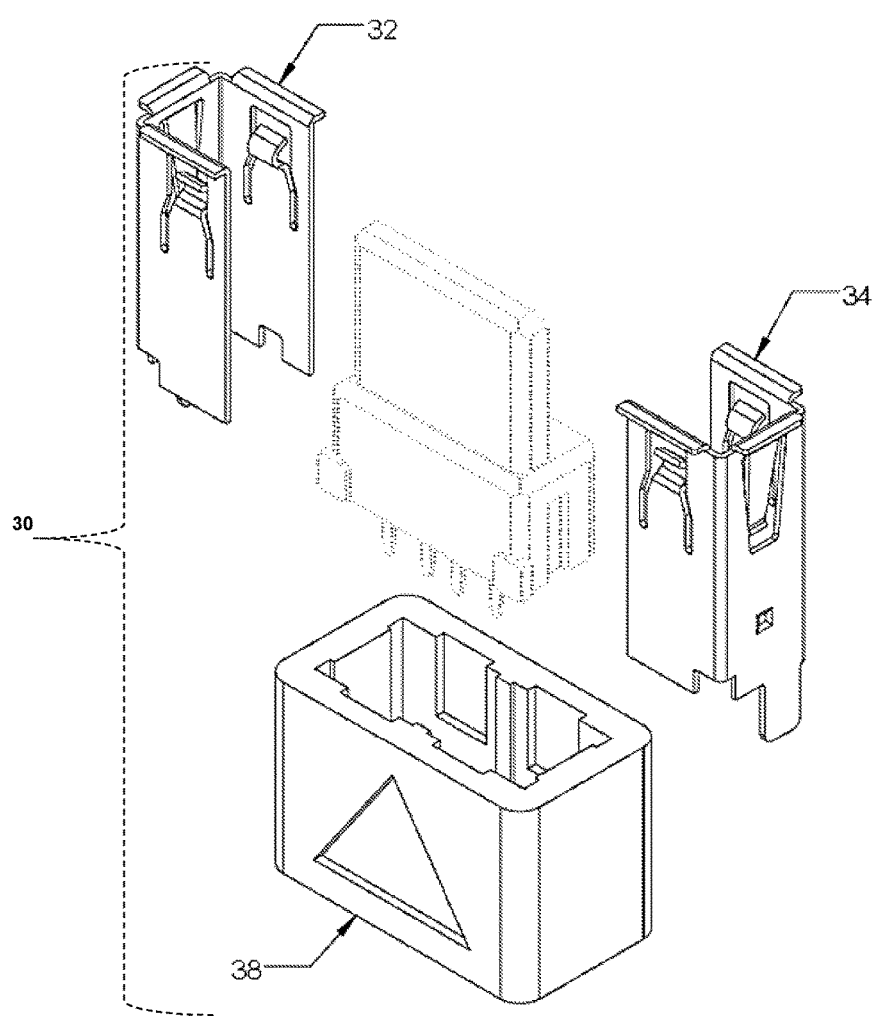
FIG. 2A is a schematic drawing in isometric, exploded view of an embodiment of a split shell USB receptacle as described herein.
Figure 2B:
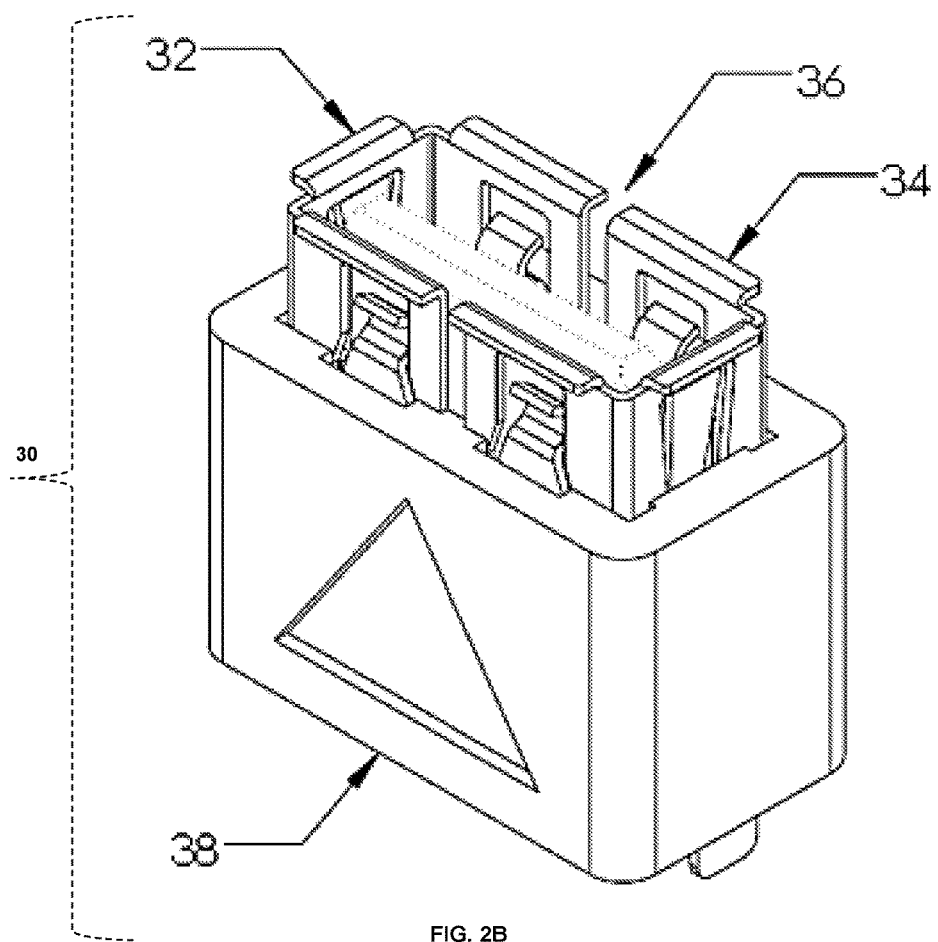
FIG. 2B is a schematic drawing in isometric, assembled view of an embodiment of a split shell USB receptacle as described herein.

FIGS. 2A and 2B show a schematic drawing in isometric view of an embodiment of a split shell USB receptacle as described herein. The split shell USB receptacle 30 comprises a first shell side 32, a second shell side 34, and a housing 38. FIG. 2A shows an exploded view of the first shell side 32, second shell side 34, and housing 38, e.g., a view of the split shell USB receptacle 30 in a disassembled state. In some embodiments, upon assembly of the first shell side 32, second shell side 34, and housing 38 as shown in FIG. 2B, the split shell USB receptacle 30 comprises a physical separation 36 (e.g., a gap) that physically and electrically isolates the first shell side 32 from the second shell side 34. In this embodiment, current does not flow from the first shell side 32 to and through the second shell side 34 (e.g., to complete a circuit (e.g., an on/off logic circuit, a charger circuit) in the absence of a conductor (e.g., a plug (e.g., a plug comprising a shell (e.g., a plug comprising a shell comprising a conducting material)) that physically and/or electrically connects the first shell side 32 and the second shell side 34, e.g., when a USB plug is inserted into (e.g., mated with) the split shell USB receptacle and the plug shell physically and/or electrically connects the first shell side 32 and the second shell side 34.

The technology, however, is not limited to the configuration shown is FIG. 2A and FIG. 2B. Accordingly, any configuration in which the split shell USB receptacle comprises a portion of the shell that is physically and/or electrically separated from another portion of the shell (e.g., such that no electricity can flow through the shell and/or portions of the shell due to the absence of a completed circuit) can be used in the split shell USB receptacle technology and embodiments of the technology (e.g., methods, systems, kits) comprising the split shell USB receptacle technology and use of the split shell USB receptacle technology. For example, in some embodiments the long dimension of the receptacle shell is divided by the gap approximately in half to provide a first shell side and a second shell side of approximately the same length in the long dimension of the receptacle shell (see, e.g., FIGS. 2A and 2B; see FIGS. 4A and 4B). However, the technology is not limited to this arrangement and encompasses designs in which the gap divides the long dimension of the receptacle shell at other positions. In some embodiments, the gap divides the receptacle shell to provide a first shell side and a second shell side having lengths in the long dimension of the receptacle shell that have a ratio of approximately 1:2 (e.g., the gap divides the receptacle shell into a first shell side having a length approximately ⅓ the length of the long dimension of the receptacle shell and a second shell side having a length approximately ⅔ the length of the long dimension of the receptacle shell). In some embodiments, the gap divides the receptacle shell to provide a first shell side and a second shell side having lengths in the long dimension of the receptacle shell that have a ratio of approximately 1:3 (e.g., the gap divides the receptacle shell into a first shell side having a length approximately ¼ the length of the long dimension of the receptacle shell and a second shell side having a length approximately ¾ the length of the long dimension of the receptacle shell). In some embodiments, the gap divides the receptacle shell to provide a first shell side and a second shell side having lengths in the long dimension of the receptacle shell that have a ratio of approximately 1:4 (e.g., the gap divides the receptacle shell into a first shell side having a length approximately ⅕ the length of the long dimension of the receptacle shell and a second shell side having a length approximately ⅘ the length of the long dimension of the receptacle shell). In some embodiments, the gap divides the receptacle shell to provide a first shell side and a second shell side having lengths in the long dimension of the receptacle shell that have a ratio of approximately 1:5 (e.g., the gap divides the receptacle shell into a first shell side having a length approximately ⅙ the length of the long dimension of the receptacle shell and a second shell side having a length approximately ⅚ the length of the long dimension of the receptacle shell). The technology is not limited to these illustrative embodiments and is intended to include other ratios and proportions for the first and/or second shell sides where the gap divides the long dimension of the receptacle shell to provide a first and/or second shell side that has a length that is, e.g., 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95 of the length of the long dimension of the receptacle shell.

In some embodiments, the short dimension of the receptacle shell is divided by the gap approximately in half to provide a first shell side (e.g., a "top shell side") and a second shell side (e.g., a "bottom shell side") of approximately the same length in the short dimension of the receptacle shell. However, the technology is not limited to this arrangement and encompasses designs in which the gap divides the short dimension at other positions. In some embodiments, the gap divides the receptacle shell to provide a top shell side and a bottom shell side having lengths in the short dimension of the receptacle shell that have a ratio of approximately 1:2 (e.g., the gap divides the receptacle shell into a top shell side having a length approximately ⅓ the length of the short dimension of the receptacle shell and a bottom shell side having a length approximately ⅔ the length of the short dimension of the receptacle shell). In some embodiments, the gap divides the receptacle shell to provide a top shell side and a bottom shell side having lengths in the short dimension of the receptacle shell that have a ratio of approximately 1:3 (e.g., the gap divides the receptacle shell into a top shell side having a length approximately ¼ the length of the short dimension of the receptacle shell and a bottom shell side having a length approximately ¾ the length of the short dimension of the receptacle shell). In some embodiments, the gap divides the receptacle shell to provide a top shell side and a bottom shell side having lengths in the short dimension of the receptacle shell that have a ratio of approximately 1:4 (e.g., the gap divides the receptacle shell into a top shell side having a length approximately ⅕ the length of the short dimension of the receptacle shell and a bottom shell side having a length approximately ⅘ the length of the short dimension of the receptacle shell). In some embodiments, the gap divides the receptacle shell to provide a top shell side and a bottom shell side having lengths in the short dimension of the receptacle shell that have a ratio of approximately 1:5 (e.g., the gap divides the receptacle shell into a top shell side having a length approximately ⅙ the length of the short dimension of the receptacle shell and a bottom shell side having a length approximately ⅚ the length of the short dimension of the receptacle shell). The technology is not limited to these illustrative embodiments and is intended to include other ratios and proportions for the first and/or bottom shell halves where the gap divides the short dimension of the receptacle shell to provide a first and/or bottom shell side that has a length that is, e.g., 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95 of the length of the short dimension of the receptacle shell. Embodiments of the technology herein described in terms of first shell side and second shell side are intended to apply also to designs of the split shell receptacle comprising a top shell side and a bottom shell side.

The technology is not limited in the material that physically and/or electrically separates the first shell side from the second shell side or that physically and/or electrically separates the top shell side from the bottom shell side (e.g., the material that provides the gap). In some embodiments, the material that physically and/or electrically separates the first shell side from the second shell side or that physically and/or electrically separates the top shell side from the bottom shell side (e.g., the material that provides the gap) is air (e.g., the gap is an air gap). In some embodiments, the material that physically and/or electrically separates the first shell side from the second shell side or that physically and/or electrically separates the top shell side from the bottom shell side (e.g., the material that provides the gap) is vacuum (e.g., the gap is a vacuum gap, e.g., in environments where air is not present). In some embodiments, the material that physically and/or electrically separates the first shell side from the second shell side or that physically and/or electrically separates the top shell side from the bottom shell side (e.g., the material that provides the gap) is an insulator, e.g., an insulator that is a non-conducting polymer (e.g., plastic, rubber, silicone, etc.), glass, a non-conducting organic material, paper, quartz, ceramic, etc.

The technology is not limited in the size of the physical and/or electrical separation between the first shell side and the second shell side or between the top shell side and the bottom shell side (e.g., the gap) provide that separation (e.g., the gap) physically and/or electrically separates the first shell side from the second shell side or the top shell side and the bottom shell side and thus minimizes and/or eliminates electrical contact between the first shell side and the second shell side or between the top shell side and the bottom shell side. For example, in some embodiments, the size of the separation (e.g., the gap) is approximately 0.1 cm to 1 cm (e.g., approximately 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1 cm).

In some embodiments, the technology relates to a USB plug specifically designed to mate with a receptacle comprising a split shell as described herein. For instance, in some embodiments, a plug is configured specifically to mate with a split shell USB receptacle as described herein and provide electrical contact across the first shell side and second shell side, e.g., to make contact with the first shell side and the second shell side of the USB receptacle comprising a split shell, e.g., by increasing the firmness and/or pressure of the plug shell at an appropriate site on the receptacle split shell to provide and/or maintain an improved electrical contact between the first shell side and the second shell side. For instance, in some embodiments, the plug comprises a mechanical component (e.g., a spring, brushing, etc.) that presses a conducting component of the plug shell with an increased firmness at the site of contact between the first shell side and the second shell side to establish electrical contact between the first shell side and the second shell side.

In some embodiments, a plug is designed to have an improved (e.g., increased) electrical contact with the first shell side and the second shell side of the USB receptacle comprising a split shell, e.g., by increasing the conductivity of the plug shell at an appropriate site to provide increased and/or more efficient current flow between the first shell side and the second shell side. For example, in some embodiments, a plug shell has a material at the site of contact between the first shell side and the second shell side that is different than the remainder of the plug shell, e.g., in some embodiments the plug shell is mainly made of a first material (e.g., stainless steel) and comprises another metal (e.g., silver, copper, gold, aluminum, zinc, nickel, brass, bronze, iron or platinum) at the site that makes contact with the first shell side and the second shell side to establish electrical contact between the first shell side and the second shell side.

In some embodiments, the split shell receptacle comprises a physical component that prevents a conventional USB plug from mating with a split shell USB receptacle. Some embodiments provide a specially designed USB plug that is designed to mate with a split shell USB receptacle that comprises a physical component that prevents a conventional plug from mating with a split shell USB receptacle but that is able to mate with the specially designed USB plug. Accordingly, embodiments provide a split shell USB receptacle and a USB plug specifically designed to mate with each other and not able to mate with a conventional USB plug and USB receptacle.

Charging System

Figure 3:
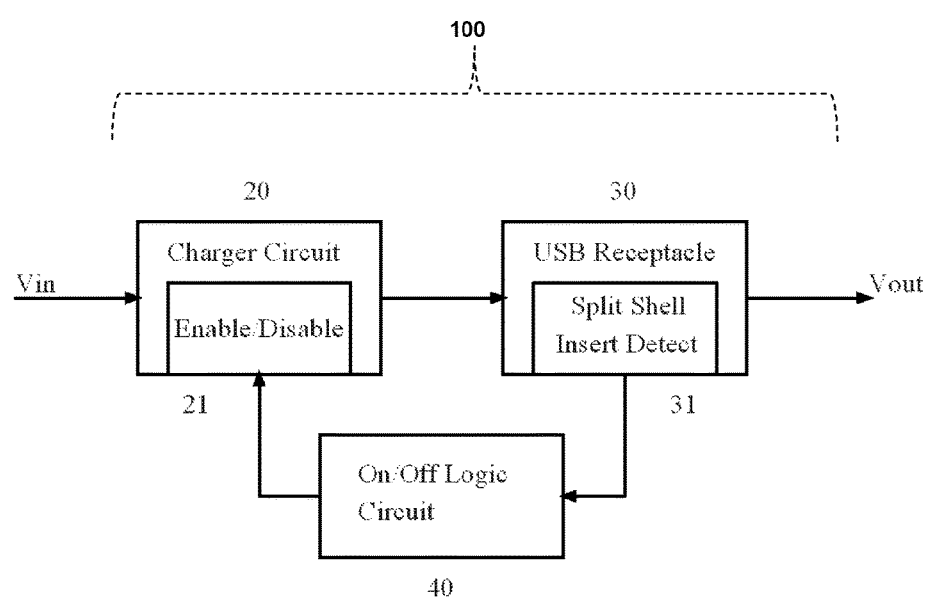
FIG. 3 is a schematic diagram of an embodiment of a charging system comprising a split shell USB Receptacle as provided herein.

FIG. 3 shows a schematic diagram for an embodiment of a charging system 100 comprising a split shell USB receptacle 30 as provided herein. In particular, FIG. 3 is a schematic diagram of a charging system comprising a split shell USB receptacle 30, e.g., an embodiment of a split shell USB receptacle 30 as shown in FIG. 2. In some embodiments, the charger circuit (e.g., Charger Circuit 20) is configured such that no electricity flows to and/or through the USB receptacle until an electrical connection is made between the two portions (e.g., sides) of the split shell (e.g., a first portion and/or first shell side 32 and a second portion and/or shell side 34) upon insertion of a conductive material (e.g., conductive portion of a USB plug (e.g., a USB plug shell)) into the split-shell USB receptacle (e.g., an embodiment of the split shell USB receptacle 30).

In some embodiments, the split shell USB receptacle is configured (e.g., physically and/or electrically) to turn on and/or enable a charging circuit (e.g., Charger Circuit 20) when the two sides of the physically and/or electrically separated split shell are physically and/or electrically connected (e.g., when a plug is mated with the receptacle (e.g., when a plug is connected and/or inserted into the receptacle, completing the circuit and allowing electricity to flow)). In some embodiments, the split shell USB receptacle is configured (e.g., physically and/or electrically) to turn off and/or disable a charging circuit (e.g., Charger Circuit 20) when the two sides of the split shell are physically and/or electrically not connected (e.g., when a mated plug is removed from the split shell receptacle (e.g., when a USB plug is disconnected and/or removed from the split shell receptacle, thereby interrupting the circuit and preventing the flow of electricity)).

In some embodiments (e.g., the embodiment shown in FIG. 3), a charging system (e.g., charging system 100) comprises a component (e.g., an integrated Split Shell Insert Detect 31) configured to detect the insertion of a USB plug (e.g., a shell of a USB plug) into an embodiment of the split shell USB receptacle. In some embodiments, the component configured to detect the insertion of a USB plug (e.g., a shell of a USB plug) into an embodiment of the split shell receptacle (e.g., Split Shell Insert Detect 31) toggles an on/off logic circuit (e.g., On/Off Logic Circuit 40). That is, embodiments provide that an on/off logic circuit (e.g., On/Off Logic Circuit 40) is in an "off" state when the split shell receptacle is unoccupied and that the on/off logic circuit (e.g., On/Off Logic Circuit 40) is in an "on" state when a USB plug is mated with the split shell USB receptacle (e.g., the USB plug shell physically and/or electrically connects the two sides of the split shell). In some embodiments, an on/off logic circuit in an "on" state (e.g., On/Off Logic Circuit 40) subsequently turns on and/or enables a charging circuit (e.g., Charger Circuit 20), e.g., by setting a pin (e.g., Enable/Disable pin 21) of the charging circuit (e.g., Charger Circuit 20) that causes the circuit to turn on. In some embodiments, an on/off logic circuit in an "off" state (e.g., On/Off Logic Circuit 40) subsequently turns off and/or disables a charging circuit (e.g., Charger Circuit 20), e.g., by setting a pin (e.g., Enable/Disable pin 21) of the charging circuit (Charger Circuit 20) that causes the circuit to turn off. Thus, according to embodiments of the technology, an on/off logic circuit (e.g., On/Off Logic Circuit 40) provides a signal (e.g., by setting a pin (e.g., Enable/Disable pin 21)) to a charging circuit (e.g., Charger Circuit 20) that turns on or turns off (e.g., enabling or disabling) the charging circuit (e.g., Charger Circuit 20).

Figure 4A:
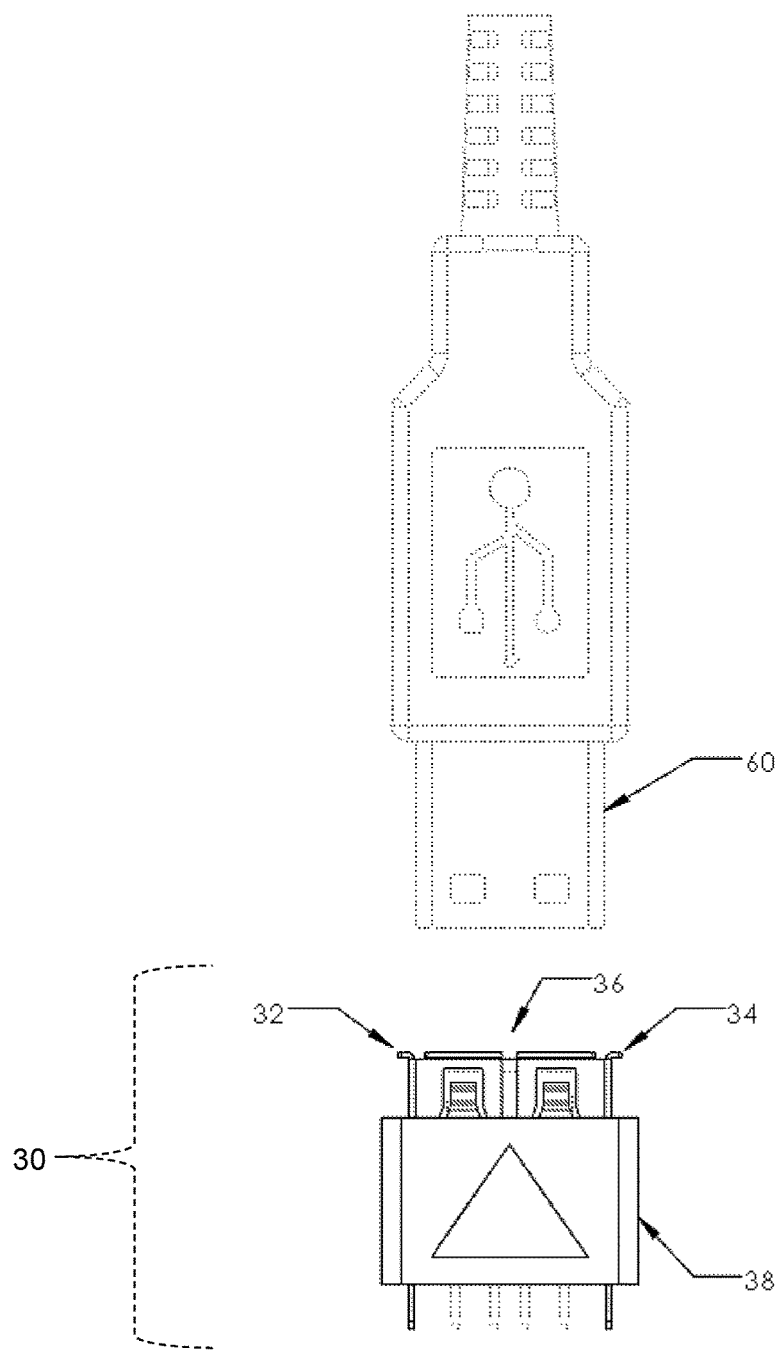
FIG. 4A is a drawing of an embodiment of a charging system comprising a split shell USB receptacle and a USB plug.
Figure 4B:
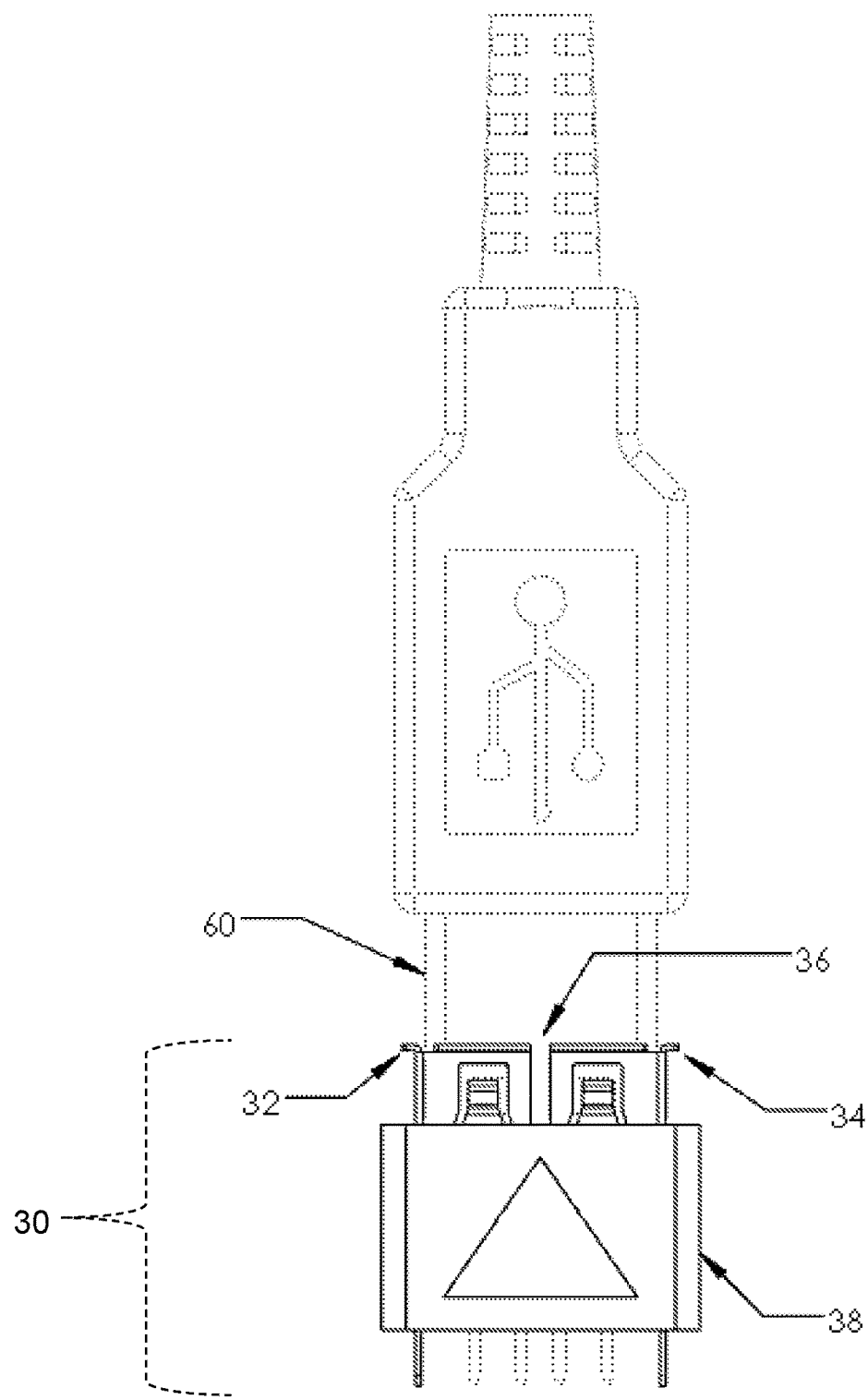
FIG. 4B is a drawing of an embodiment of a charging system comprising a split shell USB receptacle and a USB plug.

FIG. 4A and FIG. 4B show an embodiment of a charging system comprising, e.g., a split shell USB receptacle 30 and a removable conductive insert (e.g., a USB plug (e.g., USB plug 60), e.g., comprising a conductive shell) that is capable of mating with the split shell USB receptacle 30 and enabling a charging circuit (e.g., a Charger Circuit 20 as shown in FIG. 3). As shown in FIGS. 2A and 2B and in FIGS. 4A and 4B, the shell of the USB split shell receptacle 30 is separated into a first shell side 32 and a second shell side 34. The housing 38 holds the USB terminals and holds the first shell side 32 and the second shell side 34 in an arrangement that physically and/or electrically separates the first shell side 32 and the second shell side 34 from each other (e.g., forming a gap 36 between the first shell side 32 and second shell side 34). In a conventional USB receptacle, the shell of the USB receptacle is connected to ground, e.g., on a printed circuit board (PCB).

In contrast to the conventional USB receptacle comprising a conventional shell, embodiments of the technology provided herein comprise a split shell USB receptacle 30 comprising a first shell side 32 or a second shell side 34 that is connected to ground and physically and/or electrically isolated from the other shell side that is not connected to ground; the shell side 32 or 34 that is not connected to ground is connected to an on/off logic circuit (e.g., an On/Off Logic Circuit 40 as shown in FIG. 3). FIG. 4A shows a USB Plug 60 that is not mated with (e.g., not "plugged into") the split shell USB receptacle 30 and in which the On/Off Logic Circuit 40 (e.g., as shown in FIG. 3) sets the Enable/Disable pin 21 (e.g., as shown in FIG. 3) to disable (e.g., "turn off") the Charger Circuit 20 (e.g., as shown in FIG. 3). FIG. 4B shows a USB Plug 60 that is mated with (e.g., "plugged into") the split shell USB receptacle 30 and in which the shell of the USB Plug 60 contacts both the first shell side 32 and the second shell side 34, thus establishing an electrical connection between the first shell side 32 and the second shell side 34. Establishing an electrical connection between the first shell side 32 and the second shell side 34 consequently causes an on/off logic circuit (e.g., the On/Off Logic Circuit 40, e.g., as shown in FIG. 3) to set the Enable/Disable pin 21 (e.g., as shown in FIG. 3) to enable (e.g., "turn on") a charging circuit (e.g., a Charger Circuit 20, e.g., as shown in FIG. 3).

Figure 5A:
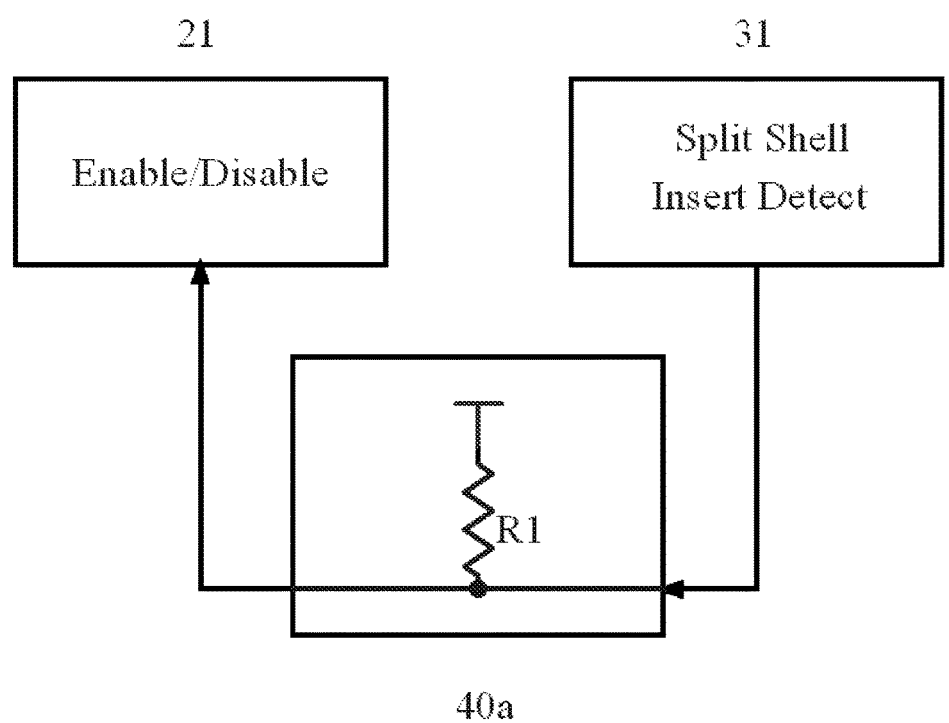
FIG. 5A is a schematic drawing showing an embodiment of an on/off logic circuit comprising a pull up resistor (R1) to set the logic signal high when the USB plug is not inserted in the receptacle.
Figure 5B:
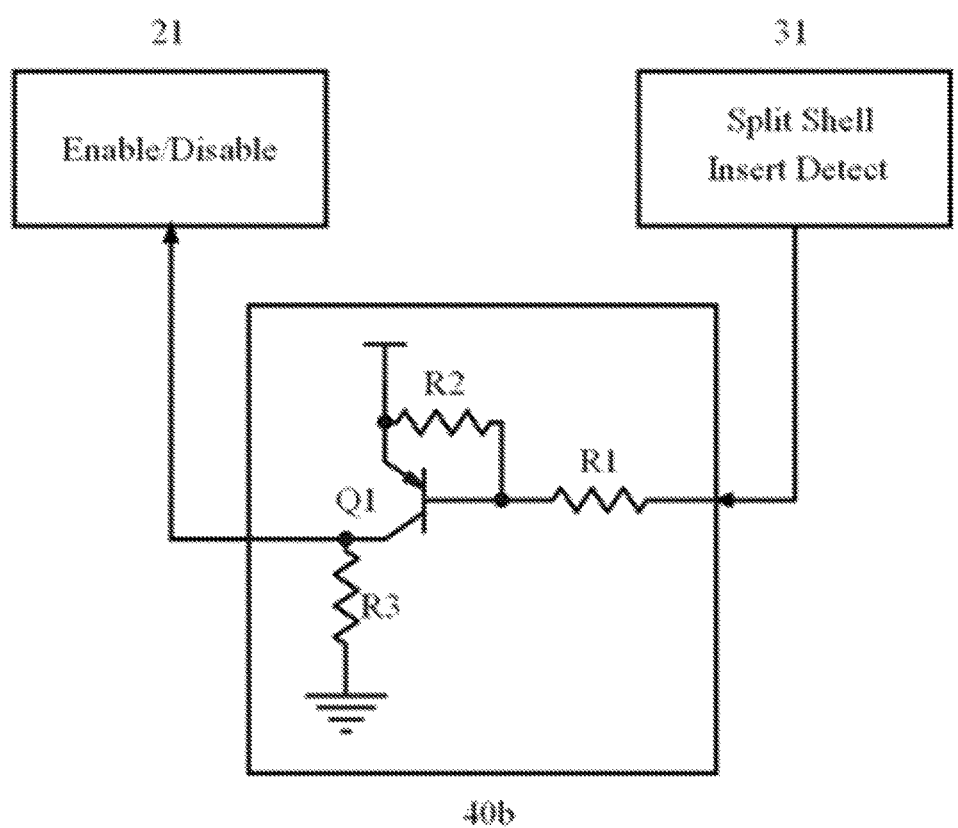
FIG. 5B is a schematic drawing showing an embodiment of an on/off logic circuit comprising a bipolar junction transistor (e.g., a PNP transistor) circuit to flip the low logic signal from the Split Shell Insert Detect to a high logic signal. R1-R3 indicate resistors and Q1 indicates a transistor.

Embodiments of these physical, electrical, and logical operations of the charging system are shown in FIGS. 5A and 5B as the Split Shell Insert Detect 31. In particular, Split Shell Insert Detect 31 comprises a circuit comprising the split shell receptacle (e.g., comprising the first shell side 32 and the second shell side 34). When a USB plug is mated with the split shell receptacle, the Split Shell Insert Detect 31 further comprises the USB plug shell. In some embodiments, the "insert detect" function of Split Shell Insert Detect 31 is provided by completing a circuit comprising the first shell side 32 and the second shell side 34 by establishing electrical connection between the first shell side 32 and the second shell side 34 with the shell of the USB plug.

As shown in FIGS. 2A and 2B and in FIGS. 4A and 4B, one of the first shell side 32 or the second shell side 34 of the split shell USB receptacle 30 is connected to ground and the other one of the first shell side 32 or the second shell side 34 of the split shell USB receptacle 30 is connected to an on/off logic circuit (e.g., On/Off Logic Circuit 40). Two embodiments (On/Off Logic Circuit 40a, e.g., as shown in FIG. 5A, and On/Off Logic Circuit 40b, e.g., as shown in FIG. 5B) of an on/off logic circuit (e.g., On/Off Logic Circuit 40) are shown in FIGS. 5A and 5B. One of the first shell side 32 or the second shell side 34 of the split shell USB receptacle 30 is connected to ground and the Split Shell Insert Detect 31 provides an Active Low logic signal to the Enable/Disable pin 21 of the Charger Circuit 20. In some embodiments in which the Charger Circuit 20 is enabled by an Active Low logic signal, the On/Off Logic Circuit 40 (e.g., On/Off Logic Circuit 40a) comprises a pull up resistor R1 to set the logic signal high when the USB Plug 60 is not inserted in the receptacle as shown in FIG. 5A. In some embodiments in which the Charger Circuit 20 is enabled by an Active High logic signal, the On/Off Logic Circuit 40 (e.g., On/Off Logic Circuit 40b) comprises an inverter or a bipolar junction transistor (e.g., a PNP transistor) circuit to flip the low logic signal from the Split Shell Insert Detect 31 to a high logic signal, e.g., as shown in FIG. 5B.

Figure 6:
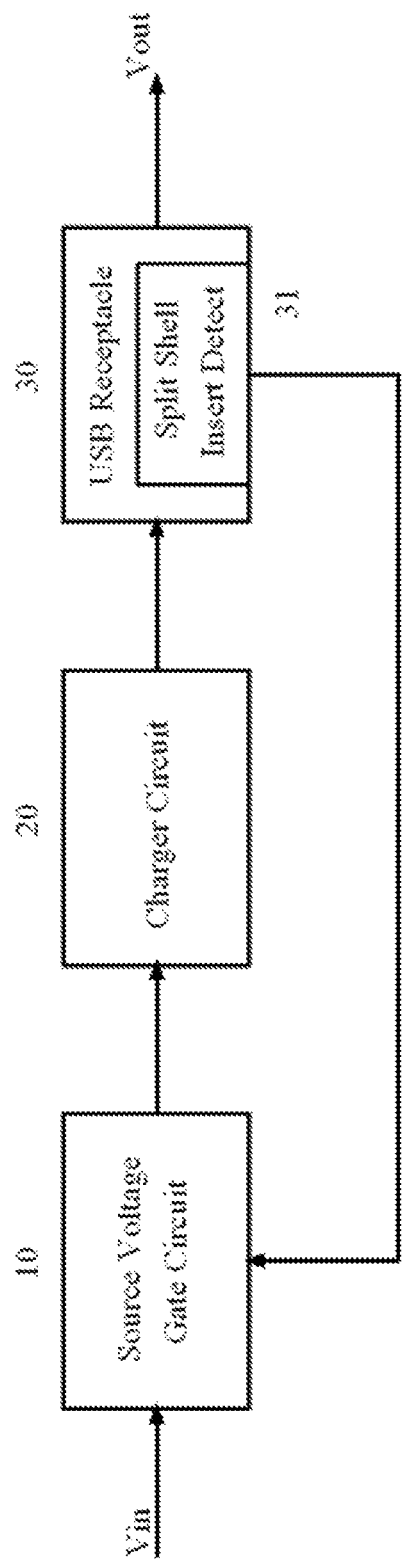
FIG. 6 is a schematic drawing showing an embodiment of a circuit comprising a Source Voltage Gate Circuit between the source voltage ($V_{in}$) and the Charger Circuit.
Figure 7A:
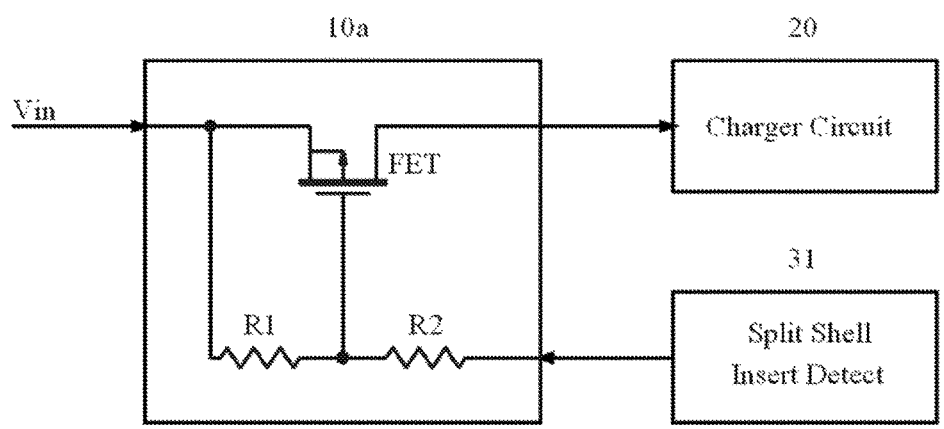
FIG. 7A is a schematic drawing showing an embodiment of the Source Voltage Gate Circuit comprising a solid state component (e.g., a field effect transistor, FET).
Figure 7B:
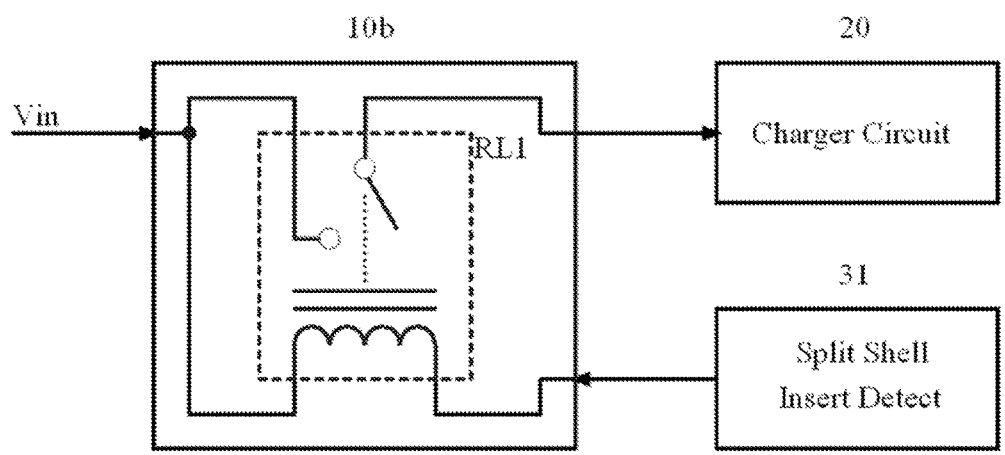
FIG. 7B is a schematic drawing showing an embodiment of the Source Voltage Gate Circuit comprising an electromechanical component (e.g., a relay, RL1).

In some embodiments, the Charger Circuit 20 does not comprise an enable/disable logic pin (e.g., Enable/Disable pin 21). Thus, some embodiments (e.g., as shown in FIG. 6) comprise a Source Voltage Gate Circuit 10 between the source voltage ($V_{in}$) and the Charger Circuit 20. The Source Voltage Gate Circuit 10 automatically connects or disconnects the power source to the Charger Circuit 20 depending on the Split Shell Insert Detect 31 signal. In some embodiments, the Source Voltage Gate Circuit 10 is a solid state component 10a (see, e.g., FIG. 7A). In some embodiments, the Source Voltage Gate Circuit 10 is an electromechanical component 10b (see, e.g., FIG. 7B). FIG. 7A shows an example solid state component 10a schematic that uses a P-channel power metal-oxide semiconductor field-effect transistor (MOSFET) to connect the supply voltage to the Charger Circuit 20. FIG. 7B shows an example electromechanical schematic 10b that uses a relay to connect the supply voltage to the Charger Circuit 20.

Uses

The technology finds use in a wide-range of hosts comprising a USB receptacle. Embodiments of the technology replace conventional USB receptacles with the split shell USB receptacle provided herein. Non-limiting examples of items (e.g., a host) comprising an embodiment of the split shell USB receptacle as described herein include, e.g., furniture, consumer electronics devices, computers, appliances, USB chargers, battery-powered USB chargers, and motorized vehicles (e.g., an automobile, truck, bus, motorcycle, motorized tricycle, motorized bicycle, train, boat, scooter, mobility assistive device, airplane, helicopter, etc.). Further non-limiting examples of items (e.g., a host) comprising an embodiment of the split shell USB receptacle as described herein include, e.g., a lamp, a household electrical socket (e.g., providing household current), a commercial electrical socket, a battery, a USB hub, a computer keyboard, a television, an uninterruptable power source (UPS), a rack mount server, a medical device, musical equipment and musical components (e.g, musical keyboards, MIDI controllers, mixers, amplifiers, pre-amplifiers, effects units, DJ controllers, turntables, compact disc players, digital signal processor units, etc.), network routers, network switches, NAS (network-attached storage) devices, disk drives, computer monitors, video game consoles, etc.

Split Shell Detect Circuit Design

Figure 8:
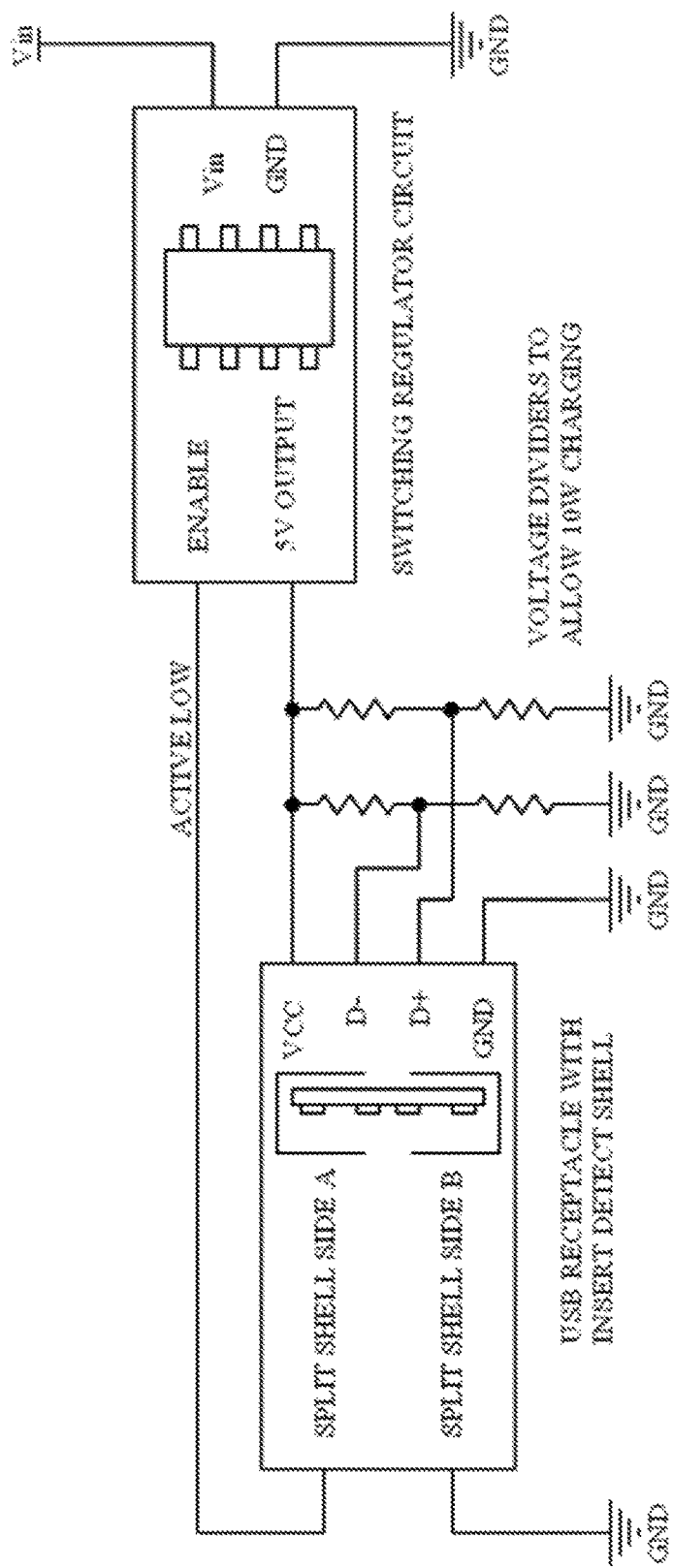
FIG. 8 is a schematic drawing of an exemplary embodiment of a USB Split Shell Detect Circuit as described herein.

During the development of embodiments of the technology provided herein, a USB Split Shell Detect Circuit was designed (FIG. 8). USB is a serial bus that uses four shielded wires for USB 2.0; two wires are used for power (VCC (or $V_{BUS}$) and GND) and two wires are used for differential data signals (labelled as D+ and D– in pinouts). The D+ and D– signals are transmitted on a differential pair, thus providing half-duplex data transfers.

As shown in FIG. 8, an embodiment of the USB receptacle with "Split Shell" insert detect technology physically separates the metal shell into two sides (FIG. 8, "Side A" and "Side B") of the USB receptacle that are electrically isolated from each other. In the embodiment shown in FIG. 8, one side of the split shell is connected to the USB charger enable circuit VCC (FIG. 8, "Side A") and the other side of the split shell is connected to ground GND (FIG. 8, "Side B"). When a USB plug is inserted into the split shell receptacle, the shell of the USB plug makes contact with both sides of the USB receptacle split metal shell, thus establishing an electrical connection between the split shells and enabling the USB charger circuit.

As shown in FIG. 8, some embodiments of the USB Split Shell Detect Circuit technology comprise a power source ($V_{in}$) and a ground (GND). In some embodiments, the technology comprises one or more voltage dividers to provide 10-W charging. In some embodiments, the technology comprises a switching regulator circuit in which an active low signal enables the charger circuit.

The use of additional pins for some conventional insert detection solutions, e.g., as described in the "Universal Serial Bus Power Delivery Specification", limits the USB connector to configurations of a single horizontal position and requires changes to the PCB footprint to accommodate the additional pins. In contrast, the technology provided herein relating to the "split shell" USB receptacle with insert detect can be integrated into all USB connector types, specifications, and quantities with no or minimal changes to existing PCB footprints.

Split Shell USB Receptacle Testing

During the development of embodiments of the technology, experiments were conducted to measure the current draw of an embodiment of the Split Shell USB Receptacle as described herein. Further, the current draw of a conventional USB Receptacle was measured for comparison.

First, the voltage output and current draw of a conventional USB charger (e.g., conventional USB receptacle) were measured without a USB plug inserted into the USB receptacle. The data collected indicated that the output of the charger circuit was 5 V DC and that the current draw of the charger circuit was 8 mA.

Next, the voltage output and current draw of an embodiment of a Split Shell USB charger (e.g., a Split Shell USB receptacle) with insert detect as described herein were measured without a USB plug inserted into the Split Shell USB receptacle. The data collected indicated that the output of the charger circuit was 0 V DC and that the current draw of the charger circuit was 0.29 mA.

Accordingly, the data indicated that the embodiment of the Split Shell USB Receptacle tested improved (e.g., decreased) the current from 8 mA to 0.29 mA. The decrease from an 8-mA current to a 0.29-mA current was provided by the technology as described herein wherein an open circuit is produced by the physical separation (and electrical separation) of Split Shell Side-A from Split Shell Side-B. This separation provides a technology that provides a charging current only when a Split Shell USB receptacle is in use (e.g., is mated with a USB plug, e.g., when a USB plug is inserted into the Split Shell USB Receptacle).

This improvement (e.g., decrease) in current draw from 8 mA to 0.29 mA extends the life of a battery powering a host comprising a Split Shell USB charging receptacle by several times, e.g., at least twice and up to 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 or more times. For instance, the battery life of a static recliner chair or lift chair comprising a Split Shell USB charging receptacle is twenty-seven times longer than the battery life of the same static recliner chair or lift chair comprising a conventional USB charging receptacle. The extended battery life provides seven times the number of motion cycles for the recliner chair or lift chair comprising a Split Shell USB charging receptacle relative to the same recliner chair or lift chair comprising a conventional USB charging receptacle.

Calculated US Cost Savings

Based on the improvement in reducing wasted electricity, calculations were performed to estimate the energy savings that could be attained each year in U.S. if the technology described herein were adopted and incorporated into all USB charger circuits. Assuming that three inactive USB chargers can be attributed to each person in the U.S. and that energy cost is approximately $0.12/kWh, in excess of $39 million dollars would be saved in energy consumption each year by adopting the technology described herein for incorporation into USB charger circuits (Table 1).

TABLE 1

US Cost Savings provided by adopting Split Shell Receptacle
Population of US 321,000,000
Number of USBs (assuming 3 per person) 963,000,000

|  | Watts | Wh/day (per USB) | kWh/yr (per USB) | kWh/yr (all USBs) | Cost Per Year |
|---|---|---|---|---|---|
| 8 mA drain (conventional USB) | 0.04 | 0.96 | 0.3504 | 337,435,200 | $40,492,224 |
| 0.29 mA drain (Split Shell USB) | 0.00145 | 0.0348 | 0.0127 | 12,232,026 | $1,467,843 |
|  |  |  | Savings Using Split Shell Design |  | $39,024,381 |

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

What is claimed is:

1. A universal serial bus (USB) charging system comprising:
   a) a charging circuit comprising a power source comprising an enable/disable pin; and
   b) a USB receptacle comprising USB terminals and a first shell side that is physically and/or electrically separated from a second shell side, wherein one of the shell sides is connected to a ground and the other shell side is electrically connected to an on/off logic circuit comprising a pull-up resistor, an inverter, or a transistor, and wherein the on/off logic circuit is electrically connected to the charging circuit comprising the power source and enable/disable pin;
   wherein the charging circuit provides approximately 0 V to the USB terminals and/or consumes less than approximately 9 mW from the power supply when the USB receptacle is unmated with a USB plug; and wherein the charging circuit provides approximately 5 V DC to the USB terminals and/or consumes more than approximately 0.25 W from the power supply when a USB plug is mated with the USB receptacle and electrically connects the first shell side and the second shell side.

2. The USB charging system of claim 1 wherein the power supply is a source of direct current.

3. The USB charging system of claim 1 wherein the power supply is a battery.

4. The USB charging system of claim 1 wherein the power supply is a source of alternating current.

5. A method for charging a universal serial bus (USB) device, the method comprising:
   a) providing a USB device comprising a USB plug;
   b) providing a universal serial bus (USB) charging system comprising:
      i) a USB receptacle comprising USB terminals and a first shell side physically and/or electrically separated from a second shell side;
      ii) a charging circuit; and
      iii) a power supply;
      wherein the charging circuit provides approximately 0 V to the USB terminals and/or consumes less than approximately 9 mW from the power supply when the USB receptacle is unmated with a USB plug; and
   c) mating said USB plug to said USB receptacle; wherein when the USB plug is mated to said USB receptacle, the charging circuit provides approximately 5 V DC to the USB terminals.

6. The method of claim 5 further comprising removing said USB plug from said USB receptacle after said USB device is partially or fully charged by the USB charging system.

7. The method of claim 5 wherein removing said USB plug from said USB receptacle reduces the power consumed by the charging circuit to less than approximately 9 mW and/or wherein removing said USB plug from said USB receptacle reduces the voltage at the USB receptacle to approximately 0 V.

* * * * *